US008569942B2

(12) United States Patent
Kishimoto et al.

(10) Patent No.: US 8,569,942 B2
(45) Date of Patent: Oct. 29, 2013

(54) VEHICLE HEADLAMP AND ILLUMINATING DEVICE

(75) Inventors: Katsuhiko Kishimoto, Osaka (JP); Hidenori Kawanishi, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 0 days.

(21) Appl. No.: 12/957,998

(22) Filed: Dec. 1, 2010

(65) Prior Publication Data

US 2011/0148280 A1 Jun. 23, 2011

(30) Foreign Application Priority Data

Dec. 17, 2009 (JP) ................................. 2009-286688

(51) Int. Cl.
*H01J 1/62* (2006.01)
*F21V 9/16* (2006.01)
*B60Q 1/00* (2006.01)

(52) U.S. Cl.
USPC .............................. 313/483; 362/538; 362/84

(58) Field of Classification Search
None
See application file for complete search history.

(56) References Cited

U.S. PATENT DOCUMENTS 3,701,895 A 10/1972 Sweetser
4,688,884 A 8/1987 Scifres et al.
4,723,198 A 2/1988 Levin et al.
5,278,731 A 1/1994 Davenport et al.
5,535,230 A 7/1996 Abe
5,647,662 A 7/1997 Ziegler et al.
5,857,768 A 1/1999 Ziegler et al.
5,947,592 A 9/1999 Barlow
6,055,154 A 4/2000 Azar
6,114,715 A 9/2000 Hamada
6,272,269 B1 8/2001 Naum
6,398,366 B1 6/2002 Hara et al.
6,439,751 B1 8/2002 Jones et al.
6,509,674 B1 1/2003 Nakagawa
6,771,236 B1 8/2004 Konishi et al.
6,981,782 B2 1/2006 Kai et al.
7,108,400 B2 9/2006 Yamada et al.
7,147,918 B2 12/2006 Nishibayashi et al.
7,275,848 B2 10/2007 Chinniah et al.
7,309,145 B2 12/2007 Nagata et al.

(Continued)

FOREIGN PATENT DOCUMENTS

CN 1499125 5/2004
CN 1824728 8/2006

(Continued)

OTHER PUBLICATIONS

Public Notice Specifying Details of Safety Standards for Road Vehicle, Appendix 51 (Specified Standards for Style of Headlamp), Sep. 26, 2003; pp. 1-17 with Partial English translation of relevant portions (5 pages).

(Continued)

*Primary Examiner* — Britt D Hanley
(74) *Attorney, Agent, or Firm* — Morrison & Foerster LLP

(57) ABSTRACT

A headlamp 1 includes a laser diode 3 that emits a laser beam, a light emitting part 7 that emits light upon receiving the laser beam emitted from the laser diode 3, and a reflection mirror 8 that reflects the light emitted from the light emitting part 7. According to the headlamp 1, the light emitting part 7 has a luminance greater than 25 cd/mm$^2$, and an area size of an aperture plane 8*a* perpendicular to a direction in which an incoherent light travels outward from the headlamp 1 is less than 2000 mm$^2$.

7 Claims, 7 Drawing Sheets

(56) References Cited

U.S. PATENT DOCUMENTS

| | | | |
|---|---|---|---|
| 7,367,679 B2 | 5/2008 | Emery |
| 7,422,356 B2 | 9/2008 | Hama et al. |
| 7,478,932 B2 | 1/2009 | Chinniah et al. |
| 7,510,284 B2 | 3/2009 | Plut |
| 7,628,492 B2 | 12/2009 | Yoshii et al. |
| 2002/0044455 A1 | 4/2002 | Ozawa et al. |
| 2002/0053868 A1 | 5/2002 | Shimizu et al. |
| 2002/0187571 A1 | 12/2002 | Collins et al. |
| 2003/0052595 A1 | 3/2003 | Ellens et al. |
| 2003/0174509 A1 | 9/2003 | Futami |
| 2003/0186475 A1 | 10/2003 | Ueda et al. |
| 2004/0062699 A1 | 4/2004 | Oshio |
| 2004/0085768 A1 | 5/2004 | Kai et al. |
| 2004/0090790 A1 | 5/2004 | Ishida et al. |
| 2004/0207306 A1 | 10/2004 | Horiuchi et al. |
| 2004/0228130 A1 | 11/2004 | Kato et al. |
| 2005/0051790 A1 | 3/2005 | Ueda |
| 2005/0063169 A1 | 3/2005 | Erber |
| 2005/0094397 A1 | 5/2005 | Yamada et al. |
| 2005/0105301 A1 | 5/2005 | Takeda et al. |
| 2005/0116176 A1 | 6/2005 | Aguirre et al. |
| 2005/0116177 A1 | 6/2005 | Aguirre et al. |
| 2005/0116178 A1 | 6/2005 | Aguirre et al. |
| 2005/0116179 A1 | 6/2005 | Aguirre et al. |
| 2005/0127383 A1 | 6/2005 | Kikawa et al. |
| 2005/0243570 A1 | 11/2005 | Chaves et al. |
| 2005/0253153 A1 | 11/2005 | Harada |
| 2006/0050512 A1 | 3/2006 | Nakagawa et al. |
| 2006/0054656 A1 | 3/2006 | Narita et al. |
| 2006/0118775 A1 | 6/2006 | Nagai et al. |
| 2006/0121695 A1 | 6/2006 | Ueda et al. |
| 2006/0170332 A1 | 8/2006 | Tamaki et al. |
| 2006/0181894 A1 | 8/2006 | Chinniah et al. |
| 2006/0186377 A1 | 8/2006 | Takahashi et al. |
| 2006/0203349 A1 | 9/2006 | Kamijima |
| 2006/0232973 A1 | 10/2006 | Haga et al. |
| 2006/0238103 A1 | 10/2006 | Choi et al. |
| 2006/0239006 A1 | 10/2006 | Chaves et al. |
| 2006/0255711 A1 | 11/2006 | Dejima et al. |
| 2006/0285341 A1 | 12/2006 | Yatsuda et al. |
| 2007/0007494 A1 | 1/2007 | Hirosaki et al. |
| 2007/0008734 A1 | 1/2007 | Bogner et al. |
| 2007/0041197 A1 | 2/2007 | Saito et al. |
| 2007/0057269 A1 | 3/2007 | Ueda |
| 2007/0127240 A1 | 6/2007 | Inamoto |
| 2007/0131954 A1 | 6/2007 | Murayama et al. |
| 2007/0185261 A1 | 8/2007 | Lee et al. |
| 2007/0189352 A1 | 8/2007 | Nagahama et al. |
| 2008/0013316 A1 | 1/2008 | Chiang |
| 2008/0037268 A1 | 2/2008 | Tendo et al. |
| 2008/0051632 A1 | 2/2008 | Ito et al. |
| 2008/0074752 A1 | 3/2008 | Chaves et al. |
| 2008/0089089 A1 | 4/2008 | Hama et al. |
| 2008/0117620 A1 | 5/2008 | Hama et al. |
| 2008/0169752 A1 | 7/2008 | Hattori et al. |
| 2008/0170296 A1 | 7/2008 | Chaves et al. |
| 2008/0173884 A1 | 7/2008 | Chitnis et al. |
| 2008/0175008 A1 | 7/2008 | Hu et al. |
| 2008/0179611 A1 | 7/2008 | Chitnis et al. |
| 2008/0198603 A1 | 8/2008 | Sormani et al. |
| 2008/0205062 A1 | 8/2008 | Dahm et al. |
| 2008/0225550 A1 | 9/2008 | Sakurada |
| 2008/0237569 A1 | 10/2008 | Nago et al. |
| 2008/0239725 A1 | 10/2008 | Ishikura et al. |
| 2008/0262316 A1 | 10/2008 | Ajima et al. |
| 2008/0278460 A1 | 11/2008 | Arnett et al. |
| 2009/0008655 A1 | 1/2009 | Peeters et al. |
| 2009/0052189 A1 | 2/2009 | Kon |
| 2009/0057690 A1 | 3/2009 | Chakraborty |
| 2009/0059594 A1 | 3/2009 | Lin |
| 2009/0065790 A1 | 3/2009 | Chitnis et al. |
| 2009/0067179 A1 | 3/2009 | Chaves et al. |
| 2009/0073710 A1 | 3/2009 | Sormani et al. |
| 2009/0095960 A1 | 4/2009 | Murayama |
| 2009/0128781 A1 | 5/2009 | Li |
| 2009/0201577 A1 | 8/2009 | LaPlante et al. |
| 2009/0231874 A1 | 9/2009 | Kishimoto et al. |
| 2009/0257463 A1 | 10/2009 | Kusukame et al. |
| 2009/0273921 A1 | 11/2009 | Chiang |
| 2009/0273924 A1 | 11/2009 | Chiang |
| 2009/0296018 A1 | 12/2009 | Harle et al. |
| 2010/0046245 A1 | 2/2010 | Ansari et al. |
| 2010/0073600 A1 | 3/2010 | Itoh et al. |
| 2010/0091516 A1 | 4/2010 | Haerle et al. |
| 2010/0096967 A1 | 4/2010 | Marinus et al. |
| 2010/0102250 A1 | 4/2010 | Li et al. |
| 2010/0103966 A1 | 4/2010 | Mizushima et al. |
| 2010/0164365 A1 | 7/2010 | Yoshino et al. |
| 2010/0171440 A1 | 7/2010 | Satou et al. |
| 2010/0202152 A1 | 8/2010 | Nakada |
| 2010/0254153 A1 | 10/2010 | Hama et al. |
| 2011/0044070 A1 | 2/2011 | Takahashi |
| 2011/0063874 A1 | 3/2011 | Yatsuda et al. |
| 2011/0068360 A1 | 3/2011 | Nago et al. |
| 2011/0068679 A1 | 3/2011 | Sawamura et al. |
| 2011/0176305 A1 | 7/2011 | Schallmoser |
| 2011/0182072 A1 | 7/2011 | Shimizu et al. |
| 2011/0194302 A1 | 8/2011 | Kishimoto et al. |
| 2011/0248624 A1 | 10/2011 | Kishimoto et al. |
| 2011/0279007 A1 | 11/2011 | Kishimoto |
| 2011/0279039 A1 | 11/2011 | Kishimoto |
| 2011/0280032 A1 | 11/2011 | Kishimoto |
| 2011/0280033 A1 | 11/2011 | Kishimoto et al. |
| 2011/0280039 A1 | 11/2011 | Kishimoto |
| 2012/0026503 A1 | 2/2012 | Lewandowski et al. |
| 2012/0106178 A1 | 5/2012 | Takahashi et al. |

FOREIGN PATENT DOCUMENTS

| | | |
|---|---|---|
| CN | 101226978 | 7/2008 |
| CN | 101627481 | 1/2010 |
| JP | 60-186076 | 9/1985 |
| JP | 62-254355 | 11/1987 |
| JP | 4-43529 | 2/1992 |
| JP | 4-73801 | 3/1992 |
| JP | 6-203606 | 7/1994 |
| JP | 7-282609 | 10/1995 |
| JP | 7-318998 | 12/1995 |
| JP | 7-335016 | 12/1995 |
| JP | 8-185703 | 7/1996 |
| JP | 8-264885 | 10/1996 |
| JP | 9-10238 | 1/1997 |
| JP | 10-326520 | 12/1998 |
| JP | 11-195303 | 7/1999 |
| JP | 2000-81516 | 3/2000 |
| JP | 2000-231905 | 8/2000 |
| JP | 2001-15839 | 1/2001 |
| JP | 2001-127002 | 5/2001 |
| JP | 2001-264832 | 9/2001 |
| JP | 2002-100214 | 4/2002 |
| JP | 2002-323726 | 11/2002 |
| JP | 2003-69086 | 3/2003 |
| JP | 2003-509821 | 3/2003 |
| JP | 2003-295319 | 10/2003 |
| JP | 2003-332237 | 11/2003 |
| JP | 2004-87435 | 3/2004 |
| JP | 2004-87925 | 3/2004 |
| JP | 2004-115304 | 4/2004 |
| JP | 2004-200531 | 7/2004 |
| JP | 2004-241142 | 8/2004 |
| JP | 2004-301977 | 10/2004 |
| JP | 2004-327361 | 11/2004 |
| JP | 2005-19981 | 1/2005 |
| JP | 2005-055199 | 3/2005 |
| JP | 2005-56852 | 3/2005 |
| JP | 2005-56952 | 3/2005 |
| JP | 2005-109402 | 4/2005 |
| JP | 2005-150041 | 6/2005 |
| JP | 2005-157251 | 6/2005 |
| JP | 2005-175111 | 6/2005 |
| JP | 2005-294185 | 10/2005 |
| JP | 2005-311170 | 11/2005 |
| JP | 2005-347223 | 12/2005 |
| JP | 2006-40843 | 2/2006 |

(56) References Cited

FOREIGN PATENT DOCUMENTS

| | | |
|---|---|---|
| JP | 2006-61685 | 3/2006 |
| JP | 2006-100287 | 4/2006 |
| JP | 2006-154408 | 6/2006 |
| JP | 2006-164796 | 6/2006 |
| JP | 2006-521667 | 9/2006 |
| JP | 2006-296498 | 11/2006 |
| JP | 2006-351369 | 12/2006 |
| JP | 2007-65600 | 3/2007 |
| JP | 2007-66911 | 3/2007 |
| JP | 2007-88078 | 4/2007 |
| JP | 2007-95931 | 4/2007 |
| JP | 2007-142452 | 6/2007 |
| JP | 2007-157548 | 6/2007 |
| JP | 2007-515270 | 6/2007 |
| JP | 2007-173177 | 7/2007 |
| JP | 2007-173595 | 7/2007 |
| JP | 2007-196224 | 8/2007 |
| JP | 2007-258019 | 10/2007 |
| JP | 2007-294754 | 11/2007 |
| JP | 2007-323858 | 12/2007 |
| JP | 2008-10518 | 1/2008 |
| JP | 2008-27910 | 2/2008 |
| JP | 2008-66297 | 3/2008 |
| JP | 2008-124504 | 5/2008 |
| JP | 2008-129683 | 6/2008 |
| JP | 2008-135261 | 6/2008 |
| JP | 2008-135411 | 6/2008 |
| JP | 2008-145838 | 6/2008 |
| JP | 2008-150518 | 7/2008 |
| JP | 2008-234908 | 10/2008 |
| JP | 2008-243714 | 10/2008 |
| JP | 2008-243904 | 10/2008 |
| JP | 2008-262910 | 10/2008 |
| JP | 2008-270229 | 11/2008 |
| JP | 2008-277447 | 11/2008 |
| JP | 2009-19573 | 1/2009 |
| JP | 2009-21506 | 1/2009 |
| JP | 2009-70766 | 4/2009 |
| JP | 2009-104913 | 5/2009 |
| JP | 2009-104933 | 5/2009 |
| JP | 2009-108327 | 5/2009 |
| JP | 2009-129590 | 6/2009 |
| JP | 2009-129683 | 6/2009 |
| JP | 2009-140874 | 6/2009 |
| JP | 2009-523308 | 6/2009 |
| JP | 2009-176443 | 8/2009 |
| JP | 2009-180935 | 8/2009 |
| JP | 2009-224053 | 10/2009 |
| JP | 2009-266437 | 11/2009 |
| JP | 2009-541950 | 11/2009 |
| JP | 2009-289976 | 12/2009 |
| JP | 201015902 | 1/2010 |
| JP | 2010-62108 | 3/2010 |
| JP | 2010-80306 | 4/2010 |
| JP | 2010-102913 | 5/2010 |
| JP | 2010-182574 | 8/2010 |
| JP | 2011-65979 | 3/2011 |
| JP | 2011-108961 | 6/2011 |
| KR | 10-665221 | 12/2006 |
| WO | WO-2004/081140 | 9/2004 |
| WO | WO-2006/038502 | 4/2006 |
| WO | WO-2006/098267 | 9/2006 |
| WO | WO-2008/117211 | 10/2008 |
| WO | WO-2009/031289 | 3/2009 |
| WO | WO-2009/145141 | 12/2009 |
| WO | WO-2010/003763 | 1/2010 |
| WO | WO-2010/047882 | 4/2010 |
| WO | WO-2010/116305 | 10/2010 |

OTHER PUBLICATIONS

Kishimoto et al., U.S. Office Action mailed Jun. 18, 2012, directed to U.S. Appl. No. 13/081,295; 9 pages.

Kishimoto et al., U.S. Office Action mailed Sep. 25, 2012, directed to U.S. Appl. No. 13/023,300; 9 pages.

Kishimoto et al., U.S. Office Action mailed Dec. 4, 2012, directed to U.S. Appl. No. 13/081,295; 11 pages.

Kishimoto, U.S. Office Action mailed Dec. 21, 2012, directed to U.S. Appl. No. 13/108,764; 13 pages.

Sasaki, M. (2005). "Applications of White LED Lighting to Automobile Onboard Devices," *Japanese Journal of Applied Physics* 74(11):1463-1466.

Kishimoto et al., U.S. Office Action mailed Jan. 17, 2013, directed to U.S. Appl. No. 13/023,300; 8 pages.

Kishimoto, U.S. Office Action mailed Feb. 20, 2013, directed to U.S. Appl. No. 13/107,440; 11 pages.

Kishimoto, U.S. Advisory Action mailed Feb. 25, 2013, directed to U.S. Appl. No. 13/081,295; 4 pages.

Kishimoto et al., U.S. Office Action mailed Mar. 19, 2013, directed to U.S. Appl. No. 13/107,449; 10 pages.

Kishimoto, U.S. Office Action mailed May 9, 2013, directed to U.S. Appl. No. 13/108,770, 14 pages.

Kishimoto et al., U.S. Office Action mailed May 17, 2013, directed to U.S. Appl. No. 13/023,300; 10 pages.

Kishimoto et al., U.S. Office Action mailed Jun. 7, 2013, directed to U.S. Appl. No. 13/108,764; 13 pages Kishimoto, U.S. Office Action Jul. 3, 2013, directed to U.S. Appl. No. 13/107,440; 13 pages.

Xie, R. et al. (2007) "Silicon-based Oxynitride and Nitride Phosphors for White LEDs—A Review, " *Science and Technology of Advanced Materials*8: 588-600.

Kishimoto, U.S. Office Action mailed Jul. 22, 2013, directed to U.S. Appl. No. 13/104,517; 11 pages.

Kishimoto et al., U.S. Office Action mailed Aug. 14, 2013, directed to U.S. Appl. No. 13/107,449; 12 pages.

Kishimoto, U.S. Office Action mailed Aug. 30, 2013, directed to U.S. Appl. No. 13/108,764; 16 pages.

Kishimoto et al., U.S. Office Action mailed Sep. 6, 2013, directed to U.S. Appl. No. 13/945,673; 9 pages.

FIG. 9

(a)

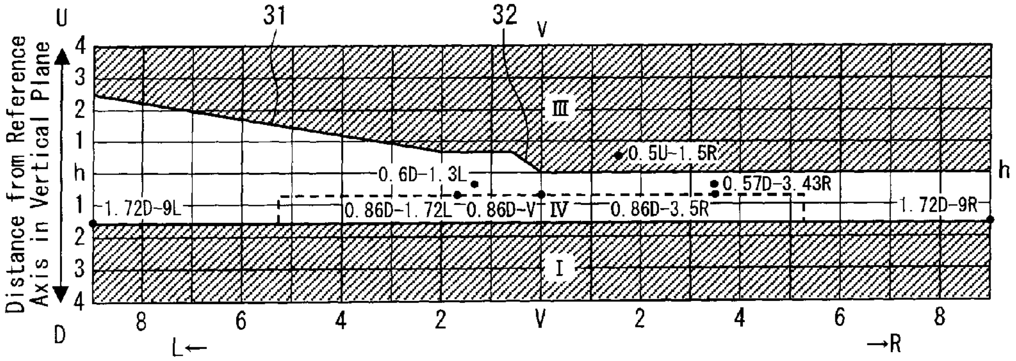

(b)

| Measurement Point or Zone | Required Illuminance (lx) |
|---|---|
| 0.5U-1.5R | 0.16≦Measured Value≦0.85 |
| 0.6D-1.3L | 13≦Measured Value |
| 0.57D-3.43R | Measured Value≦12 |
| 0.86D-1.72L | 12≦Measured Value |
| 0.86D-3.5R | 2.4≦Measured Value≦15.6 |
| 1.72D-9R | 2.0≦Measured Value |
| 1.72D-9L | 2.0≦Measured Value |
| 0.86D-V | 5.8≦Measured Value |
| Any Point in Zone III | Measured Value≦0.85 |
| Any Point in Zone IV | 3≦Measured Value |
| Any Point in Zone I | Measured Value ≦(Actual Measured Value at 0.86D-1.72L)×2 |
| Points 1, 2, 3, and 7 | 0.1≦Measured Value≦0.85 |
| Points 4, 5, 6, and 8 | 0.2≦Measured Value≦0.85 |

VEHICLE HEADLAMP AND ILLUMINATING DEVICE

This Nonprovisional application claims priority under 35 U.S.C. §119(a) on Patent Application No. 2009-286688 filed in Japan on Dec. 17, 2009, the entire contents of which are hereby incorporated by reference.

TECHNICAL FIELD

The present invention relates to a vehicle headlamp and an illuminating device each of which can be designed to be smaller in size than a conventional lamp. In particular, the present invention relates to a driving headlamp.

BACKGROUND ART

In recent years, studies have been intensively carried out for a light emitting device that uses, as illumination light, fluorescence generated by a light emitting part which includes a fluorescent material. The light emitting part generates the fluorescence upon irradiation of excitation light, which is emitted from an excitation light source. The excitation light source used is a semiconductor light emitting element, such as a light emitting diode (LED), a laser diode (LD), or the like.

Patent Literature 1 discloses a lamp, which is an example of a technique that relates to such a light emitting device. In order to achieve a high-luminance light source, the lamp employs a laser diode as an excitation light source. Since a laser beam oscillated from the laser diode is coherent and therefore highly directional, the laser beam can be collected without a loss so as to be used as excitation light. The light emitting device employing such a laser diode as the excitation light source (such a light emitting device is called an LD light emitting device) is suitably applicable to a vehicle headlamp.

Patent Literature 2 discloses a lamp, which is an example of a technique in which a wavelength conversion material emits visible light upon irradiation of infrared light. The lamp is configured such that the wavelength conversion material is provided at a focal point of a concave mirror, which reflects visible light emitted from the wavelength conversion material. This configuration allows the lamp to serve as a light source. The configuration of Patent Literature 2, in which the wavelength conversion material is provided at the focal point of the concave mirror, is applied to the lamp of Patent Literature 1, which has the fluorescent material provided to a parabolic reflecting surface or to an ellipsoidal reflecting surface.

Patent Literature 3 discloses a lamp, which is an example of the technique that relates to the light emitting device. The lamp contains in its light emitting part not only blue, green, and red fluorescent materials, but also a yellow fluorescent material. This achieves a light emitting device which is excellent in a color rendering property. Further, the lamp of Patent Literature 3 produces a luminous flux of approximately 1200 lm (lumen) and has a luminance of approximately 25 cd/mm$^2$, which are as high as those of a halogen lamp, and is as excellent in a color rendering property as the halogen lamp.

Further, Non Patent Literature 1 discloses a vehicle headlamp, which is an example of a technique for achieving a vehicle headlamp that employs an incoherent white LED.

CITATION LIST

Patent Literatures

Patent Literature 1

Japanese Patent Application Publication, Tokukai, No. 2005-150041 A (Publication Date: Jun. 9, 2005)

Patent Literature 2

Japanese Patent Application Publication, Tokukaihei, No. 7-318998 A (Publication Date: Dec. 8, 1995)

Patent Literature 3

Japanese Patent Application Publication, Tokukai, No. 2007-294754 A (Publication Date: Nov. 8, 2007)

Non Patent Literature

Non Patent Literature 1

Masaru Sasaki: *Hakushoku LED no Jidoushashoumei eno ouyou* (*Applications of White LED Lighting to Automobile Onboard Devices*), Japanese Journal of Applied Physics, Vol. 74, No. 11, pp. 1463-1466 (2005)

SUMMARY OF INVENTION

Technical Problem

Note, however, that Patent Literature 1 does not at all teach how much laser beam should be received by the light emitting part so as to produce a certain amount of incoherent light. Therefore, it is unclear to what extent an optical system (a concave mirror and a lens provided in the concave mirror) can be downsized, while achieving a lamp that emits light having a constant luminous intensity. That is, Patent Literature 1 does not at all mention to what extent an area size of a part, of the optical system, through which the incoherent light is emitted (i.e., an area size of an opening [aperture plane] of the concave mirror or an area size of the lens provided in the vicinity of the opening) can be reduced.

Note here that the constant luminous intensity is for example a luminous intensity of light at the maximum luminous intensity point of a vehicle high beam, which is specified under the laws of Japan. According to the current laws of Japan, a luminous intensity for each lamp should be within a range of 29500 cd (candela) to 112500 cd, and a sum of the maximum luminous intensities of all lamps (two or four lamps) in one vehicle should not exceed 225000 cd.

Patent Literature 3 does not mention a lamp having a luminance greater than 25 cd/mm$^2$. This indicates that Patent Literature 3 is not intended for downsizing of the lamp by achieving high luminance. Further, the invention of Patent Literature 3 relates to a fluorescent material included in the light emitting part, and is intended for improving of a luminous efficiency and a color rendering property. In addition, the inventors of the present invention have found that the most important factor in downsizing a lamp is luminance.

The present invention has been made in view of the problems, and an object of the present invention is to provide a vehicle headlamp that can be designed to be smaller in size than a conventional lamp.

Solution to Problem

In order to attain the above object, a vehicle headlamp in accordance with the present invention includes: an excitation light source that emits excitation light; a light emitting part that emits light upon receiving the excitation light emitted from the excitation light source; and a reflection mirror that reflects the light emitted from the light emitting part, the light emitting part having a luminance greater than 25 cd/mm$^2$, and the reflection mirror having a aperture plane whose area size is less than 2000 mm$^2$, the aperture plane being perpendicular to a direction in which the light travels outward from the vehicle headlamp.

For example, in a case where a conventional halogen lamp is used as a vehicle headlamp, the following problem occurs: that is, in order for such a vehicle headlamp to emit light having a luminous intensity near a lower limit of a range of luminous intensities (29500 cd to 112500 cd) at a maximum luminous intensity point of a driving headlamp, which range is specified under the laws of Japan, an area size of an aperture plane may not be able to be less than 2000 $mm^2$. In contrast, according to the vehicle headlamp in accordance with the present invention, it is possible to surely emit light having a luminous intensity falling within the above range, even if the area size of the aperture plane is less than 2000 $mm^2$. This is because the light emitting part has a luminance greater than 25 $cd/mm^2$, which is the maximum luminance that can be achieved by the halogen lamp.

Further, there exists an HID (High Intensity Discharge) lamp, which has a luminance of for example 75 $cd/mm^2$. Note, however, that such an HID lamp involves a problem in which it is inferior in immediate lighting (i.e., it cannot be quickly lit). Therefore, the HID lamp is not suitable for use as a vehicle headlamp (e.g., a driving headlamp) that requires immediate lighting.

As such, the vehicle headlamp in accordance with the present invention can be designed to be smaller in size than a conventional lamp (illuminating device) while taking practical utility into consideration. That is, it is possible to achieve a vehicle headlamp smaller in size than the conventional lamp.

Advantageous Effects of Invention

As described above, the vehicle headlamp in accordance with the present invention includes: an excitation light source that emits excitation light; a light emitting part that emits light upon receiving the excitation light emitted from the excitation light source; and a reflection mirror that reflects the light emitted from the light emitting part, the light emitting part having a luminance greater than 25 $cd/mm^2$, and the reflection mirror having an aperture plane whose area size is less than 2000 $mm^2$, the aperture plane being perpendicular to a direction in which the light travels outward from the vehicle headlamp.

Accordingly, it is possible to achieve a vehicle headlamp that is smaller in size than a conventional lamp, while taking practical utility into consideration.

Figure 5:
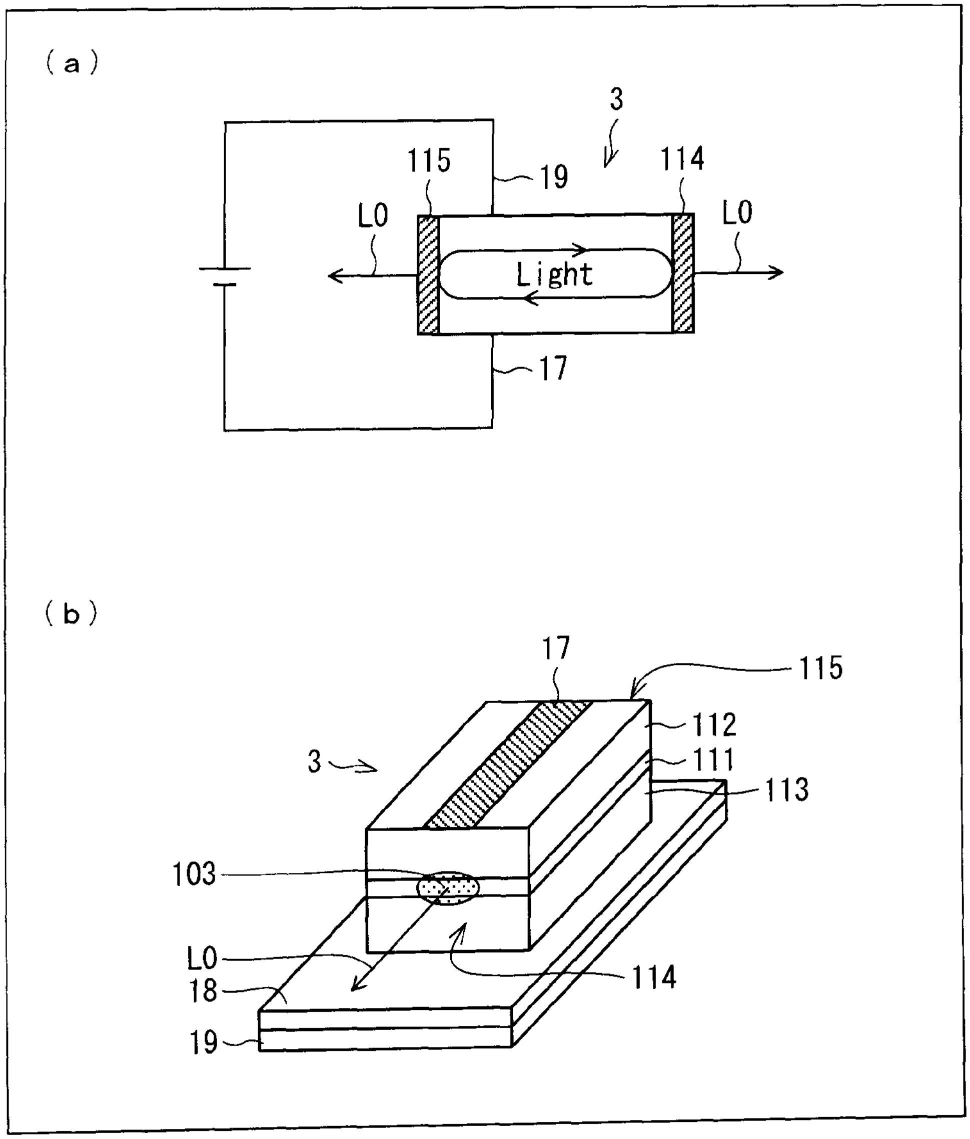

(*a*) of FIG. 5 is a view schematically illustrating a circuit diagram of a laser diode. (*b*) of FIG. 5 is a perspective view illustrating a fundamental structure of the laser diode.

Figure 6:
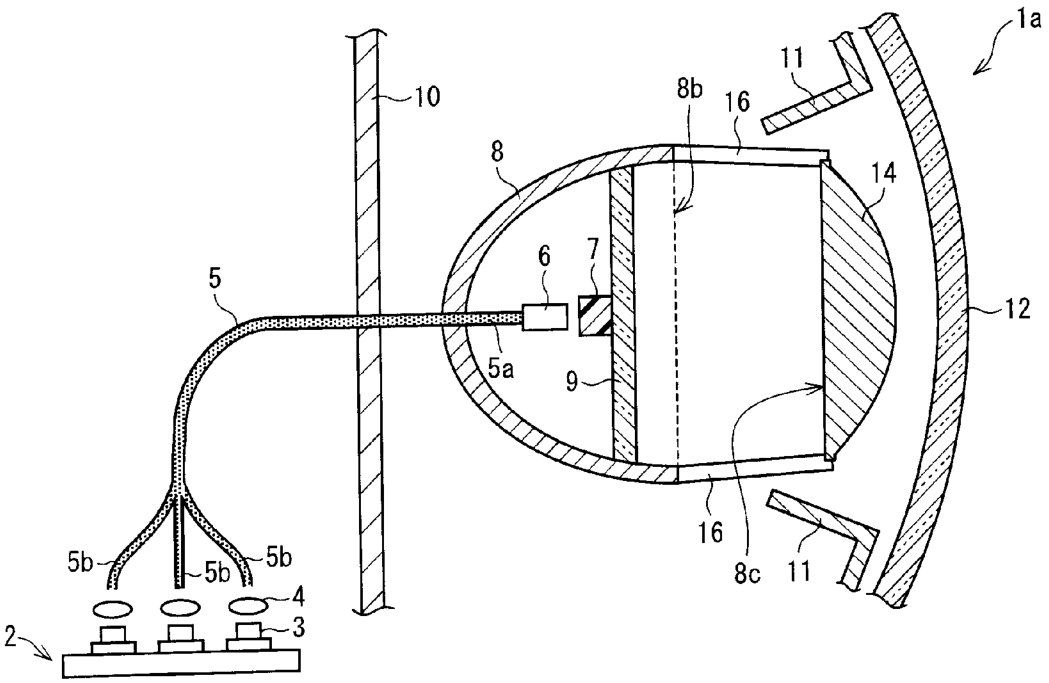

FIG. 6 is a cross-sectional view illustrating how a headlamp of another embodiment in accordance with the present invention is configured.

Figure 7:
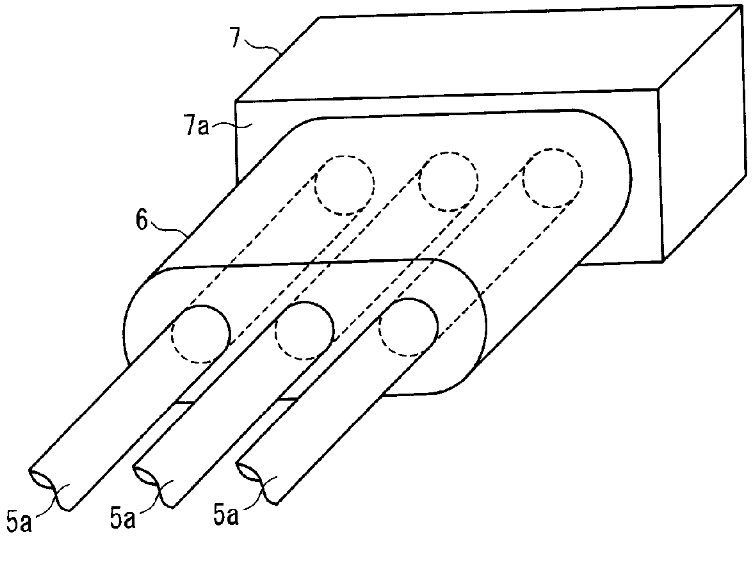

FIG. 7, showing the headlamp of the another embodiment in accordance with the present invention, is a view illustrating positional relation between exit end parts of an optical fiber and a light emitting part.

Figure 8:
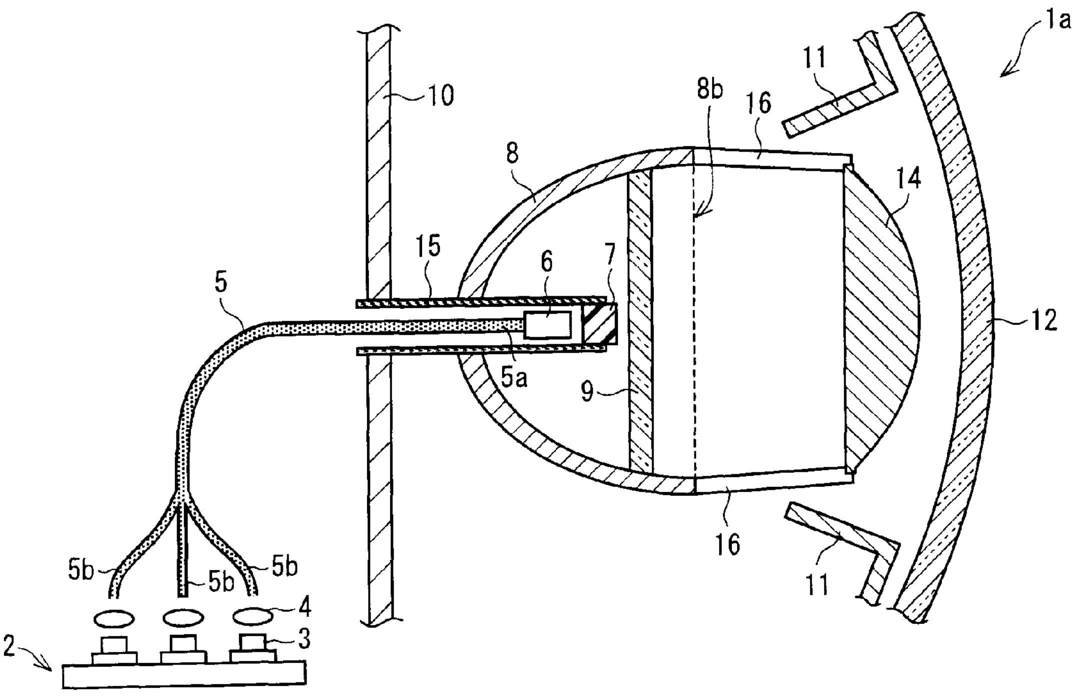

FIG. 8 is a cross-sectional view illustrating a modification of a method of positioning the light emitting part.

(*a*) of FIG. 9 is a view illustrating a light distribution property required for a passing headlamp for an automobile. (*b*) of FIG. 9 is a table showing illuminances specified in the light distribution property standards for the passing headlamp.

DESCRIPTION OF EMBODIMENTS

Embodiment 1

An embodiment of the present invention is described below with reference to FIGS. 1 through 3. In the present embodiment, a headlamp 1 that meets the light distribution property standards for a driving headlamp (i.e., a high beam) for an automobile is described as an example of a vehicle headlamp and an illuminating device in accordance with the present invention. Note, however, that the illuminating device in accordance with the present invention can be achieved also as an illuminating device for a vehicle other than the automobile or for a moving object other than the automobile (e.g., a person, a vessel, an airplane, a submersible vessel, or a rocket), as long as the illuminating device meets standards corresponding to the light distribution property standards for the driving headlamp.

(Configuration of Headlamp 1)

Figure 1:
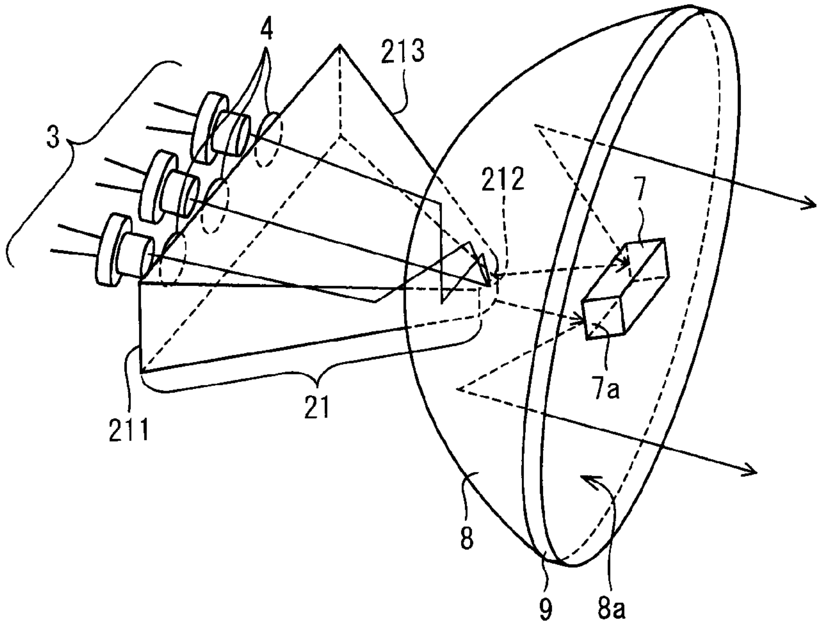
FIG. 1 is a view schematically illustrating how a headlamp of an embodiment in accordance with the present invention is configured.

First, the following description discusses, with reference to FIG. 1, how the headlamp 1 of the present embodiment is configured. FIG. 1 is a view schematically illustrating how the headlamp 1 of the present embodiment is configured. The headlamp 1 is an example of a configuration for achieving a headlamp markedly smaller in size than a conventional headlamp.

As illustrated in FIG. 1, the headlamp 1 includes laser diodes (excitation light sources) 3, aspheric lenses 4, a truncated pyramid-shaped optical element (light guide section) 21, a light emitting part 7, a reflection mirror 8, and a transparent plate 9. The laser diodes 3, the truncated pyramid-shaped optical element 21, and the light emitting part 7 constitute a fundamental structure of a light emitting device.

Note here that, although the headlamp 1 has a housing 10, an extension 11, and a lens 12 in a similar way to a headlamp 1*a* in accordance with Embodiment 2, the housing 10, the extension 11, and the lens 12 are not illustrated in FIG. 1. Further, although the present embodiment is described by exemplifying the truncated pyramid-shaped optical element 21, a shape of the optical element is not limited to the truncated pyramid shape, and therefore can be another shape such as a truncated cone or an elliptical truncated cone. Note that a configuration in which the optical element is in a shape of the truncated cone is specifically described later as a modification of the headlamp 1.

The laser diodes 3 function as the excitation light sources that emit excitation light. The laser diodes 3, by being provided on a substrate, can form laser diode array. Each of the laser diodes 3 oscillates a laser beam (excitation light).

Each of the laser diodes 3 includes a chip on which six luminous points (six stripes) are provided. For example, each of such laser diodes 3 oscillates a laser beam at a wavelength of 405 nm (bluish purple), and its output is 4.0 W, operating voltage is 5 V, and operating current is 2.67 A. Each of the laser diodes 3 is sealed in a package that is 9 mm in diameter.

A wavelength of the laser beam emitted from each of the laser diodes 3 is not limited to 405 nm, as long as the laser beam has a peak wavelength falling within a range of not less than 380 nm but not more than 470 nm. In a case where a laser beam of bluish purple or of a similar color is desired, the wavelength of the laser beam should be within a range of not less than 400 nm but not more than 420 nm. According to the headlamp 1 thus configured, it is possible to easily select and prepare a material (a raw material of a fluorescent material) of the light emitting part 7 for producing white light. Further, in a case where it is possible to prepare a good-quality laser diode, for short wavelengths, which oscillates a laser beam at a wavelength shorter than 380 nm, such a laser diode can also be employed as each of the laser diodes 3 of the present embodiment.

Since three laser diodes 3 are mounted as illustrated in FIG. 1, output power of the laser diodes 3 as a whole is 12 W, and power consumption of the laser diodes 3 as a whole is 40 W (=5 V×2.67 A×3). Note here that the number of the laser diodes 3 serving as the excitation light sources does not necessarily have to be plural, and therefore it is possible to employ only one laser diode 3. Note however that, in order to obtain a high-power laser beam, it is preferable to employ a plurality of laser diodes 3.

The aspheric lenses 4 are lenses for guiding laser beams (excitation light) oscillated from the laser diodes 3, in such a way that the laser beams enter the truncated pyramid-shaped optical element 21 through an end surface (a light receiving surface 211) of the truncated pyramid-shaped optical element 21. As each of the aspheric lenses 4, FLK N1 405 (manufactured by ALPS ELECTRIC CO., LTD.) can be used, for example. The aspheric lenses 4 are not particularly limited in shape and material as long as they have the foregoing function, but preferably have a high transmittance with respect to light at a wavelength of approximately 405 nm and are made of heat-stable materials.

The truncated pyramid-shaped optical element 21 is a light guide for converging laser beams oscillated from the laser diodes 3 and guiding the laser beams to the light emitting part 7 (a laser beam-irradiated surface 7*a* of the light emitting part 7). The truncated pyramid-shaped optical element 21 is optically combined with the laser diodes 3 via the aspheric lenses 4. The truncated pyramid-shaped optical element 21 has the light receiving surface (entrance end part) 211 and a light emitting surface (exit end part) 212. The truncated pyramid-shaped optical element 21 receives laser beams from the laser diodes 3 through the light receiving surface 211, and emits the laser beams from the light receiving surface 211 to the light emitting part 7 through the light emitting surface 212.

According to this configuration, the truncated pyramid-shaped optical element 21 is provided between the laser diodes 3 and the light emitting part 7. This makes it possible to provide the laser diodes 3 at a distance from the light emitting part 7. Accordingly, it is possible to improve flexibility in design of the headlamp 1. That is, for example, it is possible to provide the laser diodes 3 so that they can be easily cooled and/or replaced.

In a case where the laser diodes 3 can be provided close sufficiently to a bottom part (i.e., the entrance end part 211, from which excitation light enters) of the truncated pyramid-shaped optical element 21, the aspheric lenses 4 can be omitted. According to this configuration, the headlamp 1 is further simplified in its structure. In addition, since a factor of reducing the excitation light is eliminated, it is possible to further improve efficiency.

A coupling efficiency of the aspheric lenses 4 and the truncated pyramid-shaped optical element 21 is 90% (i.e., a ratio of an intensity of a laser beam from the light emitting surface 212 of the truncated pyramid-shaped optical element 21 with respect to an intensity of the laser beams from the laser diodes 3 is 0.9:1). That is, if an intensity of a laser beam from the laser diodes 3 as a whole is 12 W, then an intensity of the laser beam will be 10.8 W when emitted from the light emitting surface 212. This is as a result of the laser beam passing through the aspheric lenses 4 and the truncated pyramid-shaped optical element 21.

The truncated pyramid-shaped optical element 21 is configured such that (i) it has a structure surrounded by truncated pyramid side surfaces 213 that reflect a laser beam received through the light receiving surface 211 and (ii) the light emitting surface 212 is smaller in area size than the light receiving surface 211. With use of the truncated pyramid side surfaces 213, the truncated pyramid-shaped optical element 21 guides, to the light emitting surface 212, the laser beam received through the light receiving surface 211. Note here that the truncated pyramid-shaped optical element 21 is made of fused quarts, acrylic resin, or another transparent material. Further, the light receiving surface 211 can have a flat surface or a curved surface.

The truncated pyramid side surfaces 213 make it possible to guide, to the light emitting surface 212 smaller in area size than the light receiving surface 211, the laser beam received through the light receiving surface 211. That is, the truncated pyramid side surfaces 213 make it possible to converge laser beams to the light emitting surface 212.

Further, at an end of the truncated pyramid side surfaces 213, there is provided the light emitting surface 212, through which the converged laser beam is dispersedly emitted to the laser beam-irradiated surface 7*a* of the light emitting part 7. The light emitting surface 212 has a plane-convex cylindrical lens provided thereon, which lens has an axis perpendicular to the light emitting surface 212 and is combined with the light emitting surface 212.

Note here that, although the light emitting surface 212 and the cylindrical lens are combined with each other (that is, the light emitting surface 212 has a curved surface) according to the present embodiment, the configuration of the light emitting surface 212 and the cylindrical lens is not limited to this. Alternatively, the cylindrical lens can be provided independently from the light emitting surface 212. In this case, the cylindrical lens is provided between the light emitting surface 212 and the light emitting part 7. Further, in this case, the light emitting surface 212 can have a flat surface or a curved surface. In a case where the light emitting surface 212 has the curved surface, a shape of the curved surface is not limited to a convex lens shape, and can be a concave lens shape or a shape of a combination of the convex lens and concave lens. Such a lens shape can be spherical, aspheric, cylindrical, or the like. Moreover, depending on circumstances, the light emitting surface 212 can have a flat surface and be provided in contact with the light emitting part 7.

A laser beam is guided to the light emitting surface 212 through (i) a light path that is reflected only once by the truncated pyramid side surfaces 213, (ii) a light path that is reflected a plurality of times by the truncated pyramid side surfaces 213, or (iii) a light path that is not reflected by the truncated pyramid side surfaces 213.

The light emitting part 7 contains, so as to emit light upon receiving the laser beams emitted from the light emitting surface 212, fluorescent materials each of which emits light upon receiving a laser beam. Specifically, the light emitting part 7 is made of silicone resin, which serves as a fluorescent material-holding substance and in which the fluorescent materials are dispersed. A ratio of the silicone resin to the fluorescent materials is approximately 10:1. The light emitting part 7 can also be made by ramming the fluorescent materials. The fluorescent material-holding substance is not limited to the silicone resin, and can be so-called organic-inorganic hybrid glass or inorganic glass.

Each of the fluorescent materials is a kind of oxynitride. The fluorescent materials, which are dispersed in the silicone resin, are blue, green, and red fluorescent materials. Since each of the laser diodes 3 oscillates a laser beam at a wavelength of 405 nm (bluish purple), the light emitting part 7 emits white light upon irradiation of the laser beam emitted from each of the laser diodes 3. In view of this, the light emitting part 7 can be regarded as being a wavelength conversion material.

Each of the laser diodes 3 can also be a laser diode that emits a laser beam at a wavelength of 450 nm (blue), or a laser diode that emits a laser beam (close to so-called "blue") which has a peak wavelength falling within a range of not less than 440 nm but not more than 490 nm. In this case, the fluorescent materials should consist of yellow fluorescent materials, or of green and red fluorescent materials. In other words, each of the laser diodes 3 can emit excitation light that has a peak wavelength falling within a range of not less than 440 nm but not more than 490 nm. In this case, it is possible to easily select and prepare a material (a raw material of the fluorescent materials) of a light emitting part for generating white light. Note here that the yellow fluorescent materials are fluorescent materials each of which emits light having a peak wavelength falling within a range of not less than 560 nm but not more than 590 nm. The green fluorescent materials are fluorescent materials each of which emits light having a peak wavelength falling within a range of not less than 510 nm but not more than 560 nm. The red fluorescent materials are fluorescent materials each of which emits light having a peak wavelength falling within a range of not less than 600 nm but not more than 680 nm.

Each of the fluorescent materials is preferably a material called an oxynitride phosphor. One example of a typical oxide nitride phosphor is a sialon fluorescent material. Note here that sialon is silicon nitride in which (i) one or more of silicon atoms are substituted by an aluminum atom(s) and (ii) one or more of nitrogen atoms are substituted by an oxygen atom(s). The sialon fluorescent material can be produced by solidifying almina ($Al_2O_3$), silica ($SiO_2$), a rare-earth element, and/or the like with silicon nitride ($Si_3N_4$).

Another preferable example of the fluorescent materials is a semiconductor nanoparticle fluorescent material, which includes nanometer-size particles of a III-V group compound semiconductor.

The semiconductor nanoparticle fluorescent material is characterized in that, for example, even if the nanoparticles are made of an identical compound semiconductor (e.g., indium phosphorus: InP), it is possible to cause the nanoparticles to emit light of different colors by changing particle size of the nanoparticles. The change in color occurs due to a quantum size effect. For example, in the case where the semiconductor nanoparticle fluorescent material is made of InP, the semiconductor nanoparticle fluorescent material emits red light when each of the nanoparticles is approximately 3 nm to 4 nm in diameter (note here that the particle size is evaluated with use of a transmission electron microscope [TEM]).

Further, the semiconductor nanoparticle fluorescent material is a semiconductor-based material, and therefore the life of the fluorescence is short. Accordingly, the semiconductor nanoparticle fluorescent material can quickly convert power of the excitation light into fluorescence, and therefore is highly resistant to high-power excitation light. This is because the emission life of the semiconductor nanoparticle fluorescent material is approximately 10 nanoseconds, which is some five digits less than a commonly used fluorescent material that contains rare earth as a luminescence center.

In addition, since the emission life is short as described above, it is possible to quickly repeat absorption of a laser beam and emission of fluorescence. As such, it is possible to maintain high efficiency with respect to intense laser beams, thereby reducing heat emission from the fluorescent materials.

This makes it possible to further prevent a heat deterioration (discoloration and/or deformation) in the light emitting part 7. As such, it is possible to further prevent a reduction in the life of the light emitting device (whose fundamental structure is described later), which employs a high-power light emitting element as a light source.

The light emitting part 7 is for example in a shape of a rectangular parallelepiped having dimensions of 3 mm×1 mm×1 mm. In this case, an area size of the laser beam-irradiated surface 7*a* (i.e., a surface, of the light emitting part 7, which faces the light emitting surface 212 and receives a laser beam), which receives the laser beams from the laser diodes 3, is 3 $mm^2$. Note here that a light distribution pattern (light distribution), of the vehicle headlamp, which is specified under the laws of Japan, is narrow in a vertical direction and wide in a horizontal direction. In view of this, the light emitting part 7 having a horizontally long shape (a cross-sectional surface of the light emitting part 7 is substantially rectangular) makes it easy to achieve such a light distribution pattern. The shape of the light emitting part 7 is not limited to the rectangular parallelepiped, and can be a cylindrical column having an elliptical laser beam-irradiated surface 7*a*. The laser beam-irradiated surface 7*a* does not necessarily have to be a flat surface, and can be a curved surface. Note however that, in order to control reflection of a laser beam, it is preferable that the laser beam-irradiated surface 7*a* be a flat surface perpendicular to a light axis of the laser beam. It is further preferable that the laser beam-irradiated surface 7*a* have an area size of 1 $mm^2$ to 3 $mm^2$.

The light emitting part 7 is fixed in such a manner that it (i) is on an inner surface (i.e., a surface facing the light emitting surface 212) of the transparent plate 9, (ii) faces the light emitting surface 212, and (iii) is at a focal point (or in the vicinity of the focal point) of the reflection mirror 8. A method of fixing a position of the light emitting part 7 is not limited to this, and therefore the light emitting part 7 can be fixed by using a bar-shaped or tubular member extending from the reflection mirror 8.

As described above, according to the headlamp 1, a laser beam emitted from the light emitting surface 212 is emitted, in a horizontally dispersed manner, to the laser beam-irradiated surface 7*a*. Accordingly, in all the fluorescent materials contained in the light emitting part 7, electrons in a low-energy state are efficiently excited to a high-energy state.

According to this configuration, the laser beam emitted from the truncated pyramid-shaped optical element 21 through the light emitting surface 212 is not concentrated on a certain point on the laser beam-irradiated surface 7*a*, but is emitted dispersedly to the laser beam-irradiated surface 7*a*. This makes it possible to prevent a deterioration, in the light emitting part 7, which is caused by concentration of laser beams emitted from the laser diodes 3 to an identical point. As such, it is possible to provide a headlamp 1 with high luminous flux, high luminance, and long life.

The reflection mirror 8 reflects incoherent light (hereinafter referred to merely as "light") emitted from the light emitting part 7, thereby forming a bundle of beams reflected at predetermined solid angles. That is, the reflection mirror 8 reflects light emitted from the light emitting part 7, thereby forming a bundle of beams traveling in a forward direction from the headlamp 1. The reflection mirror 8 is for example a member having a curved surface (cup shape), whose surface is coated with a metal thin film. The reflection mirror 8 has an opening, which opens toward a direction in which the reflected light travels.

According to the present embodiment, the reflection mirror 8 has a hemispheroidal shape, whose center is a focal point of the reflection mirror 8. The reflection mirror 8 further has the opening, which has an aperture plane 8*a* that (i) is a plain perpendicular to the direction in which the light reflected by the reflection mirror 8 travels (i.e., a plain, of the reflection mirror 8, which is perpendicular to a direction in which light travels outward from the headlamp 1 [vehicle headlamp]) and (ii) includes the center of the reflection mirror 8.

Note here that, an area size of the aperture plane 8*a* is not less than 300 $mm^2$ but less than 2000 $mm^2$ (i.e., a diameter of the aperture plane 8*a* [diameter of an optical system] is not less than 19.5 mm but less than 50 mm). That is, a size of the reflection mirror 8 when viewed from the direction in which the light reflected by the reflection mirror 8 travels (i.e., when viewed from front) is not less than 300 $mm^2$ but less than 2000 $mm^2$. Note that, although an upper limit (a value close to the upper limit) of the area size of the aperture plane 8*a* is 2000 $mm^2$, the upper limit is further preferably 1500 $mm^2$ (diameter is 43.7 mm). Further, although a lower limit of the area size of the aperture plane 8*a* is 300 $mm^2$, the lower limit is further preferably 500 $mm^2$ (diameter is 25.2 mm). The reason therefor is described later. Note here that, although the aperture plane 8*a* of the present embodiment is described on the assumption that the aperture plane 8*a* is in a circular shape, the shape of the aperture plane 8*a* is not limited to the circular shape as long as the aperture plane 8*a* has an area size falling within the above range.

The transparent plate 9 is a transparent resin plate that covers the opening of the reflection mirror 8 and holds the light emitting part 7. The transparent plate 9 is preferably made of a material that (i) blocks laser beams emitted from the laser diodes 3 and (ii) transmits white light (incoherent light) produced by the light emitting part 7 converting the laser beams. The transparent plate 9 is not limited to the resin plate, and can be an inorganic glass plate or the like. The light emitting part 7 converts most of a coherent laser beam into incoherent white light. Note however that, part of the laser beam may not be converted for some reasons. Even so, since the transparent plate 9 blocks the laser beams, it is possible to prevent the laser beams from leaking out. Note here that, in a case where (a) such an effect is not necessary and (b) the light emitting part 7 is held by a member other than the transparent plate 9, the transparent plate 9 can be omitted.

As so far described, the laser diodes 3 emit high-power laser beams to the light emitting part 7, and the light emitting part 7 can receive the laser beams. Accordingly, it is possible to achieve a headlamp 1 with high luminance and high luminous flux, in which the light emitting part 7 emits luminous flux of as high as approximately 2000 lm and has a luminance of as high as 100 cd/$mm^2$.

[Modification of Headlamp 1 (Modification 1)]

Figure 2:
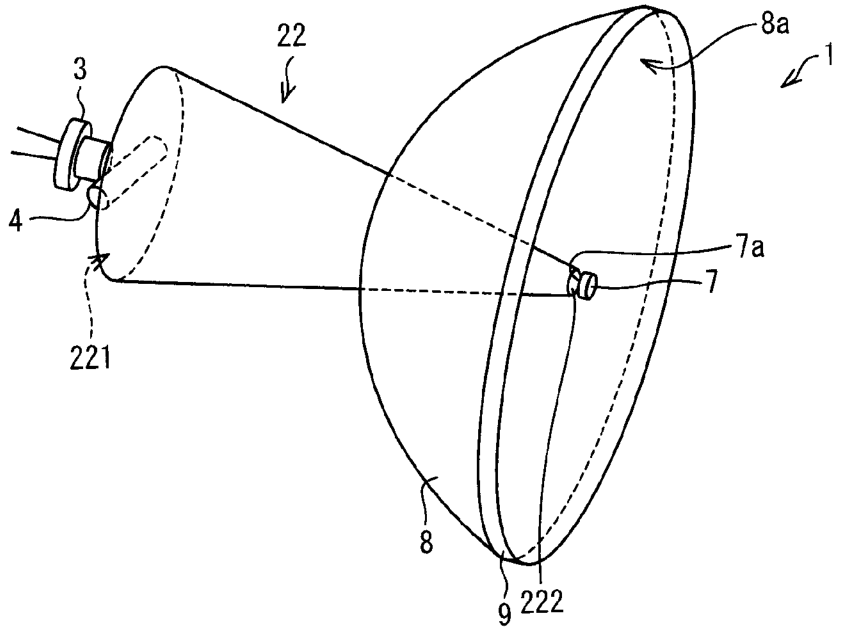
FIG. 2 is a view schematically illustrating how a headlamp, which is a modification of the embodiment in accordance with the present invention, is configured.

Next, the following description discusses, with reference to FIG. 2, a modification of the headlamp 1. FIG. 2 is a view schematically illustrating how a headlamp 1, which is a modification of the present embodiment, is configured. Note here that descriptions for configurations same as those of the earlier-described leadlight 1 are omitted here.

As illustrated in FIG. 2, the headlamp 1 includes a laser diode 3, an aspheric lens 4, a truncated cone-shaped optical element (light guide section) 22, a light emitting part 7, a reflection mirror 8, and a transparent plate 9. The laser diode 3, the truncated cone-shaped optical element 22, and the light emitting part 7 constitute a fundamental structure of a light emitting device.

The laser diode 3 includes a chip on which ten luminous points (ten stripes) are provided. For example, the laser diode 3 oscillates a laser beam at a wavelength of 405 nm (bluish purple), and its output is 11.2 W, operating voltage is 5 V, and operating current is 6.4 A. The laser diode 3 is sealed in a package that is 9 mm in diameter. Note here that only one laser diode 3 (which is sealed in the package) is provided, and power consumption of the laser diode 3 is 32 W when output is 11.2 W.

The aspheric lens 4 is a lens for guiding a laser beam (excitation light) oscillated from the laser diode 3, in such a way that the laser beam enters the truncated cone-shaped optical element 22 through an end surface (a light receiving surface 221) of the truncated cone-shaped optical element 22. In the present embodiment, a rod lens is used as the aspheric lens 4.

The truncated cone-shaped optical element 22 is a light guide for converging the laser beam oscillated from the laser diode 3 and guiding the laser beam to the light emitting part 7 (a laser beam-irradiated surface 7*a*). The truncated cone-shaped optical element 22 is optically combined with the laser diode 3 via the aspheric lens 4. The truncated cone-shaped optical element 22 has the light receiving surface (entrance end part) 221 and a light emitting surface (exit end part) 222. The truncated cone-shaped optical element 22 receives a laser beam from the laser diode 3 through the light receiving surface 221, and emits the laser beam from the light receiving surface 221 to the light emitting part 7 through the light emitting surface 222.

The truncated cone-shaped optical element 22 is a tapered and cone-shaped light guide (refractive index: 1.45), which is made of quartz ($SiO_2$). A bottom (i.e., the light receiving surface 221) of the truncated cone-shaped optical element 22 is 10 mm in diameter, and a top (i.e., the light emitting surface 222) of the truncated cone-shaped optical element 22 is 2 mm in diameter. A side surface of the truncated cone-shaped optical element 22 is coated with thermoplastic fluorocarbon resin (polytetrafluoroethylene: PTFE), which has a refractive index of 1.35. Each of the light receiving surface 221 and the light emitting surface 222 can have a flat surface or a curved surface, as is the case with the light receiving surface 211 and the light emitting surface 212.

Further, the truncated cone-shaped optical element 22 is corrected so as to make an aspect ratio of FFP (Far Field Pattern) as close to a perfect circle as possible. As used herein, the FFP indicates distribution of luminous intensities in a surface at a distance from a luminous point of a laser source. Generally, a laser beam emitted from an active layer of a semiconductor light emitting element such as the laser diode 3 or of a side surface light emitting-type diode will be dispersed widely due to a diffraction phenomenon, so that the FFP becomes an elliptical shape. Therefore, correction is needed for making the FFP close to a perfect circle.

A coupling efficiency of the aspheric lens 4 and the truncated cone-shaped optical element 22 is 90% (i.e., a ratio of an intensity of a laser beam emitted from the light emitting surface 222 of the truncated cone-shaped optical element 22 with respect to an intensity of the laser beam emitted from the laser diode 3 is 0.9:1). That is, if an intensity of a laser beam emitted from the laser diode 3 is 11.2 W, then an intensity of the laser beam will be approximately 10 W when emitted from the light emitting surface 222. This is as a result of the laser beam passing through the aspheric lens 4 and the truncated cone-shaped optical element 22.

The light emitting part 7 contains, so as to emit light upon receiving the laser beam emitted from the light emitting surface 222, the fluorescent materials as described earlier. The light emitting part 7 is a cylindrical column, which is 1.95 mm in diameter and 1 mm in height.

As described above, according also to the modification, the laser diode 3 emits a high-power laser beam to the light emitting part 7, and the light emitting part 7 can receive the laser beam. Therefore, according to the modification, it is possible to achieve a headlamp 1 (see FIG. 2) with high luminance and high luminous flux, in which the light emitting part 7 emits luminous flux of as high as approximately 1600 lm and has a luminance of as high as 80 cd/mm$^2$.

[Modification of Headlamp 1 (Modification 2)]

Figure 3:
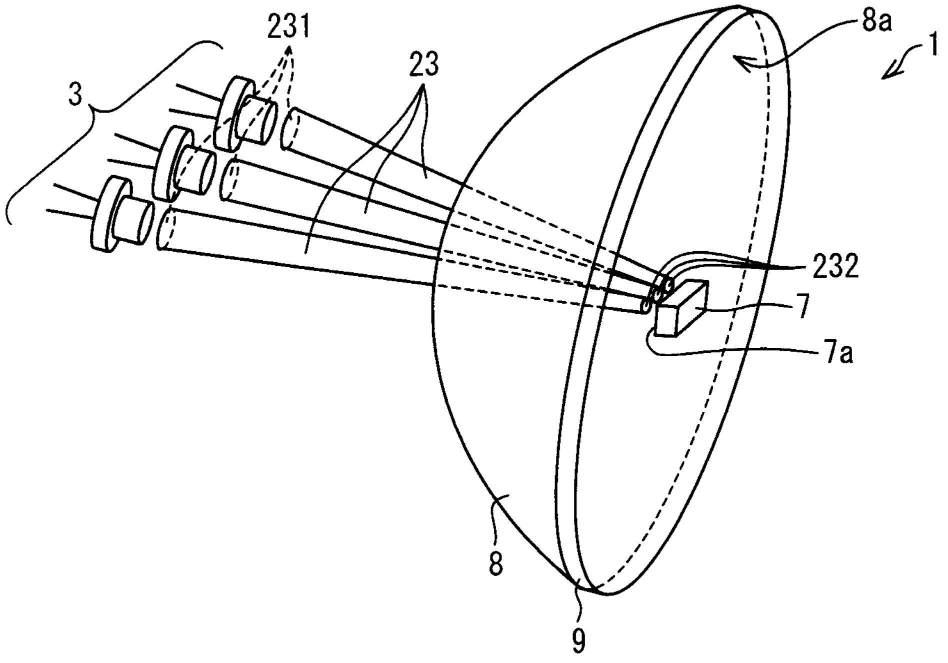
FIG. 3 is a view schematically illustrating how a headlamp, which is another modification of the embodiment in accordance with the present invention, is configured.

Next, the following description discusses, with reference to FIG. 3, another modification of the headlamp 1. FIG. 3 is a view schematically illustrating how a headlamp 1 which is another modification of the present embodiment is configured. Note here that descriptions for configurations same as those of the earlier-described leadlight 1 are omitted here.

As illustrated in FIG. 3, the headlamp 1 includes laser diodes 3, light guides (light guide sections) 23, a light emitting part 7, a reflection mirror 8, and a transparent plate 9. The laser diodes 3, the light guides 23, and the light emitting part 7 constitute a fundamental structure of a light emitting device.

Each of the laser diodes 3 includes a chip on which five luminous points (five stripes) are provided. For example, each of the laser diodes 3 oscillates a laser beam at a wavelength of 405 nm (bluish purple), and its output is 3.3 W, operating voltage is 5 V, and operating current is 2.22 A. Each of the laser diodes 3 is sealed in a package that is 9 mm in diameter. Since three laser diodes 3 are mounted as illustrated in FIG. 3, output of the laser diodes 3 as a whole is approximately 10 W, and power consumption of the laser diodes 3 as a whole is 33.3 W (=5 V×2.22 A×3).

The light guides 23 are light guides for converging laser beams oscillated from the laser diodes 3 and guiding the laser beams to the light emitting part 7 (a laser beam-irradiated surface 7*a*). The light guides 23 are provided for the respective laser diodes 3, and optically combined with the laser diodes 3. Each of the light guides 23 has a light receiving surface (entrance end part) 231 and a light emitting surface (exit end part) 232. Each of the light guides 23 receives a laser beam from a corresponding one of the laser diodes 3 through the light receiving surface 231, and emits the laser beam from the light receiving surface 231 to the light emitting part 7 through the light emitting surface 232. As is the case with the light guides described earlier, the light emitting surface 232 is smaller in area size than the light receiving surface 231. This makes it possible to converge laser beams emitted from the laser diodes 3 to the light emitting surface 232.

As illustrated in FIG. 3, the three light guides 23 are fixed in such a way that the light emitting surfaces 232 of the three light guides 23 are arrayed horizontally. The light emitting surfaces 232 can be in contact with the laser beam-irradiated surface 7*a*, and can be provided at a short distance from the laser beam-irradiated surface 7*a*.

Each of the light guides 23 is a tapered and conically-shaped tube, which is made of thermoplastic fluorocarbon resin (polytetrafluoroethylene: PTFE). The tube is filled with thermosetting acrylic resin (methyl methacrylate resin). A refractive index of PTFE is 1.35, and a refractive index of the methyl methacrylate resin is 1.49. The light receiving surface 231 is 7 mm in diameter, and the light emitting surface 232 is 1 mm in diameter. Each of the light receiving surface 231 and the light emitting surface 232 can have a flat surface or a curved surface, as is the case with the light receiving surface 211 and the light emitting surface 212.

A combining efficiency of the light guides 23 is 90% (i.e., a ratio of an intensity of a laser beam emitted from the light emitting surface 232 of each of the light guides 23 with respect to an intensity of a laser beam emitted from a corresponding one of the laser diodes 3 is 0.9:1). That is, if an intensity of a laser beam emitted from each of the laser diodes 3 is 3.3 W (i.e., a laser beam emitted from the laser diodes 3 as a whole is approximately 10 W), then an intensity of the laser beam will be approximately 3 W (i.e., the laser beam emitted from the laser diodes 3 as a whole will be approximately 9 W) when emitted from the light emitting surface 232. This is as a result of the laser beams passing through the light guides 23.

As described above, according also to the another modification, the laser diodes 3 emit high-power laser beams to the light emitting part 7, and the light emitting part 7 can receive the laser beams. Therefore, according to the another modification, it is possible to achieve a headlamp 1 (see FIG. 3) with high luminance and high luminous flux, in which the light emitting part 7 emits luminous flux of as high as approximately 1800 lm and has a luminance of as high as 80 cd/mm$^2$.

[Range of Output Values of Laser Diode 3]

Next, the following description discusses a range of output values of a laser diode 3. As described earlier, the headlamp 1 meets the light distribution property standards for a high beam. According to the current laws of Japan, it is specified that a luminous intensity at the maximum luminous intensity point of a vehicle high beam should be within a range of 29500 to 112500 cd (per lamp). The following Table 1 shows how (i) an area size, of an optical system (i.e., area size of the aperture plane 8*a*), which can be achieved while achieving a luminous intensity falling within the above range is related to (ii) a necessary luminance of a light source (i.e., a luminance of the light emitting part 7).

TABLE 1

| Area Size of Optical System (mm$^2$) | Diameter of Optical System (mm) | Lower Limit of Necessary Luminance (cd/mm$^2$) | Upper Limit of Necessary Luminance (cd/mm$^2$) |
|---|---|---|---|
| 11310 | 120 | 2.6 | 9.9 |
| 7854 | 100 | 3.8 | 14.3 |
| 5625 | 84.6 | 5.2 | 20.0 |
| 4500 | 75.7 | 6.6 | 25.0 |
| 2000 | 50.5 | 14.8 | 56.3 |
| 1750 | 47.2 | 16.9 | 64.3 |
| 1500 | 43.7 | 19.7 | 75.0 |
| 1250 | 39.9 | 23.6 | 90.0 |
| 1000 | 35.7 | 29.5 | 112.5 |
| 750 | 30.9 | 39.3 | 150.0 |
| 707 | 30.0 | 41.7 | 159.1 |
| 500 | 25.2 | 59.0 | 225.0 |
| 314 | 20 | 93.9 | 358.3 |
| 78.5 | 10 | 375.6 | 1432.4 |

Note here that a luminance (cd/mm$^2$) of a light source is found by dividing a luminous intensity (cd) by an area size (mm$^2$) of an optical system. It is assumed in Table 1 that the reflection mirror 8 does not have the transparent plate 9 and the lens 12. That is, Table 1 shows values obtained in a case where transmittance of the optical system is 100% (i.e., a ratio of light emitted outward from the headlamp 1 to light reflected by the reflection mirror 8 is 1:1).

As shown in Table 1, in order to achieve a headlamp 1 which (i) emits light having a luminous intensity falling within the above range and (ii) has the aperture plane 8*a* whose area size is 2000 $mm^2$, it is necessary that a luminance of the light emitting part 7 fall within a range of 14.8 cd/$mm^2$ to 56.3 cd/$mm^2$. The inventors of the present invention have found that, in order to achieve such luminance, it is necessary that the light emitting part 7 emit luminous flux falling within a range of 600 lm to 3000 lm. The range of 600 lm to 3000 lm is found by taking into consideration a fact that the luminous flux varies depending on the size of the light emitting part 7. Note here that this value of the luminous flux indicates a value of luminous flux emitted outward from the headlamp 1, and is found on the assumption that the transparent plate 9 and the lens 12 (these are collectively referred to as an optical system), which are provided on the headlamp 1, have light transmittance of 70%.

In order to achieve luminous flux of 600 lm, it is necessary that laser output of the laser diode 3 be within a range of 3 W to 6 W (in a case where a plurality of laser diodes 3 are provided, the laser output is that of the plurality of laser diodes 3 as a whole). Further, in order to achieve luminous flux of 3000 lm, it is necessary that laser output of the laser diode 3 be within a range of 15 W to 30 W. Such laser output varies depending on the transmittance of the optical system. For example, if the transmittance of the optical system is 70%±20%, then the laser output varies ±20%. The operating voltage and current etc. of the laser diode 3 depend on such laser output.

That is, each of the laser diodes 3 outputs a laser beam of the output value described above. Accordingly, it is possible for the light emitting part 7 to emit light having a luminous intensity falling within a range of luminous intensities at the maximum luminous intensity point as specified under the laws of Japan.

[Upper and Lower Limits of Area Size of Aperture Plane 8*a]*

Next, the following description discusses upper and lower limits of the area size of the aperture plane 8*a*.

(Upper Limit)

A halogen lamp, which has been used as a conventional headlamp 1, has a luminance of 20 cd/$mm^2$ to 25 cd/$m^2$. As shown in Table 1, in order to achieve a largest value 112500 cd (upper limit) of the luminous intensity at the maximum luminous intensity point as specified under the laws of Japan, the area size of the aperture plane (area size of the optical system) needs to be 4500 $mm^2$ to 5625 $mm^2$, or greater. Further, in order to achieve an intermediate value 71000 cd of the luminous intensity at the maximum luminous intensity point, the area size of the aperture plane needs to be 2840 $mm^2$ to 3550 $mm^2$, or greater. Furthermore, in order to achieve a value 50000 cd which is less than the intermediate value, the area size needs to be 2000 $mm^2$ to 2500 $mm^2$, or greater. Note here that the halogen lamp is configured in a similar way to the leadlight 1. Specifically, the halogen lamp has a filament, which is a light emitting part of the halogen lamp, provided in a position equivalent to that in which the light emitting part 7 is provided, and emits light that is reflected by a reflection mirror.

Note here that, generally, transmittance of the optical system of the conventional headlamp is approximately 0.6 to 0.75 (60% to 75%) (see page 1465 of Non Patent Literature 1). In a case where transmittance of the optical system is 0.6, the luminous intensity 50000 cd of light decreases to 30000 cd as a result of the light passing through the optical system. The luminous intensity 30000 cd is substantially equal to a lowest value 29500 cd (lower limit) of the luminous intensity at the maximum luminous intensity point. That is, in a case where the halogen lamp is used as a headlamp for a high beam, the area size of the aperture plane should be at least 2000 $mm^2$ so as to achieve the lower limit of the luminous intensity at the maximum luminous intensity point. Accordingly, in the case of the halogen lamp, the following problem arises: that is, even if the halogen lamp has the maximum luminance of 25 cd/$mm^2$, it may be impossible to achieve a luminous intensity falling within the range of luminous intensities at the maximum luminous intensity point, in a case where the area size of the aperture plane is less than 2000 $mm^2$.

In contrast, according to the earlier-described headlamp 1 in accordance with the present embodiment, the light emitting part 7 has a luminance not less than 80 cd/$mm^2$. Therefore, even if transmittance of the optical system is 60% and the area size of the aperture plane is less than 2000 $mm^2$, it is possible to achieve the lower limit of the luminous intensity at the maximum luminous intensity point. Further, in a case where the light emitting part 7 has a luminance of 100 cd/$mm^2$, it is possible to achieve the upper limit of the luminous intensity at the maximum luminous intensity point, even if transmittance of the optical system is 60%.

As such, according to the headlamp 1, it is possible to set the upper limit (a value closest to the upper limit) of the area size of the aperture plane 8*a* to 2000 $mm^2$, with which it may be impossible for the conventional halogen lamp to achieve the luminous intensity falling within the range of luminous intensities at the maximum luminous intensity point.

Further, an HID (luminance: 75 cd/$mm^2$) can be used in a conventional headlamp. In order for a headlamp employing the HID (such a headlamp is called an HID lamp) to achieve the upper limit of the luminous intensity at the maximum luminous intensity point, as shown in Table 1, the area size of the aperture plane needs to be 1500 $mm^2$ or greater. Note here that the HID lamp is configured in a similar way to the leadlight 1, as is the case with the halogen lamp. Specifically, the HID lamp has an arc tube, which is a light emitting part of the HID lamp, provided in a position equivalent to that in which the light emitting part 7 is provided, and emits light that is reflected by a reflection mirror.

That is, the conventional HID lamp, which has an aperture plane whose area size is less than 1500 $mm^2$, cannot achieve the upper limit of the luminous intensity at the maximum luminous intensity point. For this reason, an upper limit (a value closest to the upper limit) of the area size of the aperture plane 8*a* of the headlamp 1 is more preferably set to 1500 $mm^2$, with which it may be impossible for the conventional HID lamp to achieve the luminous intensity falling within the range of luminous intensities at the maximum luminous intensity point.

The HID includes at least (i) the arc tube made of fused quartz and (ii) two discharging electrodes which supply electric currents into the arc tube. The discharging electrodes extend from both ends of the arc tube so as to be close to a luminous point. The arc tube has, enclosed therein, mercury or ambient gas such as argon gas, which serves as a light emitting material. The HID emits light in such a manner that its incorporating light emitting material emits light. The light emitting material emits light when a discharging effect occurs in the luminous point, which effect is caused by an electric current passing through the discharging electrodes.

Since the HID emits light in such a manner that its incorporated light emitting material emits light during discharge, the HID cannot emit light having a constant luminous intensity unless the arc tube is heated to a temperature at which discharge occurs. Therefore, the HID lamp does not emit light having a constant luminous intensity for a while (for approximately 4 to 8 minutes) after a lighting switch is turned on, and thus cannot be quickly lit (i.e., not excellent in immediate lighting). An HID lamp for use as the vehicle headlamp has been improved in immediate lighting. However, the HID lamp is still not so suitable for practical use as a headlamp that requires immediate lighting, such as a headlamp for a high beam that is required to be quickly lit and unlit (i.e., so-called flashing).

In addition, since the HID needs to include at least the arc tube and two discharging electrodes, it is difficult to make the HID smaller than a certain size. Accordingly, taking into consideration a radiation efficiency of light (efficiency of the optical system [described later]), it is difficult to reduce the area size of the aperture plane of the HID lamp to less than 1500 $mm^2$.

As is clear from the above description, in order to achieve a headlamp for a high beam which (i) does not have a particular problem to be solved (i.e., inferiority in immediate lighting etc. of the HID lamp) and (ii) emits light having a luminous intensity falling within the range of luminous intensities at the maximum luminous intensity point, the area size of the aperture plane 8*a* of the headlamp 1 is preferably less than 2000 $mm^2$. On the other hand, in order to achieve a headlamp for a high beam which (a) has the problem to be solved (i.e., inferiority in immediate lighting etc. of the HID lamp) and (b) emits light having a luminous intensity falling within the range of luminous intensities at the maximum luminous intensity point, the area size is preferably less than 1500 $mm^2$.

Note that, in the HID, the arc tube and the two discharging electrodes are in the way of a light path from the luminous point, thereby blocking light from the luminous point. That is, the arc tube and the two discharging electrodes cast shadows, which may cause a reduction in luminance. Therefore, it is difficult to configure the HID lamp so as to make good use of a high luminance unique to the HID. Specifically, an actual luminance of the HID lamp does not reach a range of 60 cd/$mm^2$ to 80 cd/$mm^2$, which is described in Non Patent Literature 1. In contrast, the headlamp 1 is configured so that there is no shadow. Accordingly, it is possible for the headlamp 1 to make best use of its luminance.

Further, the HID requires a circuit (ballast) for controlling lighting of the HID. In contrast, the headlamp 1 does not need such a circuit, and therefore can be manufactured at lower cost than the HID lamp.

(Lower Limit)

According to the headlamp 1, an area size of the laser beam-irradiated surface 7*a* (size of the light emitting part 7) is limited for example to 1 $mm^2$ to 3 $mm^2$. Accordingly, in a case where the area size of the aperture plane 8*a* of the headlamp 1 is reduced to less than 300 $mm^2$, the light emitting part 7 becomes large with respect to the reflection mirror 8. This may reduce a radiation efficiency of light in the reflection mirror 8 (i.e., efficiency of the optical system may be reduced). The inventors of the present invention have found through the experiment that, if a ratio of the size of the light emitting part 7 to the area size of the aperture plane 8*a* is less than 1:100 (3 $mm^2$:300 $mm^2$), then the radiation efficiency dramatically decreases. Note here that, a state in which denominator is small is referred to as "a ratio is small". Accordingly, the area size of the aperture plane 8*a* is preferably 300 $mm^2$ or greater.

Further, the inventors of the present invention have found that a highly practical radiation efficiency is obtained in a case where the ratio is greater than 1:150. Accordingly, in a case where the area size of the laser beam-irradiated surface 7*a* is 3 $mm^2$, the area size of the aperture plane 8*a* is preferably 500 $mm^2$ or greater.

Taking into consideration the values shown in Table 1 and the lower limit of the area size of the aperture plane 8*a*, the upper limit of a luminance of the light emitting part 7 is 375 cd/$mm^2$ (in a case where the area size of the aperture plane 8*a* is 300 $mm^2$). Further, a luminance of the light emitting part 7 is preferably 225 cd/$mm^2$ (in a case where the area size of the aperture plane 8*a* is 500 $mm^2$).

Although the lower limit of the area size of the aperture plane 8*a* is preferably 300 $mm^2$ or greater as described above, the lower limit is not limited to this range. That is, the lower limit can be 100 $mm^2$ or greater. In other words, the area size of the aperture plane 8*a* can be 100 $mm^2$ or greater (11.2 mm or greater in diameter). In this case, even if the area size of the laser beam-irradiated surface 7*a* is 1 $mm^2$ (the smallest size of the light emitting part 7 for receiving a laser beam), it is possible to prevent a reduction in a radiation efficiency of light.

(Comparative Example with Conventional Headlamp)

Figure 4:
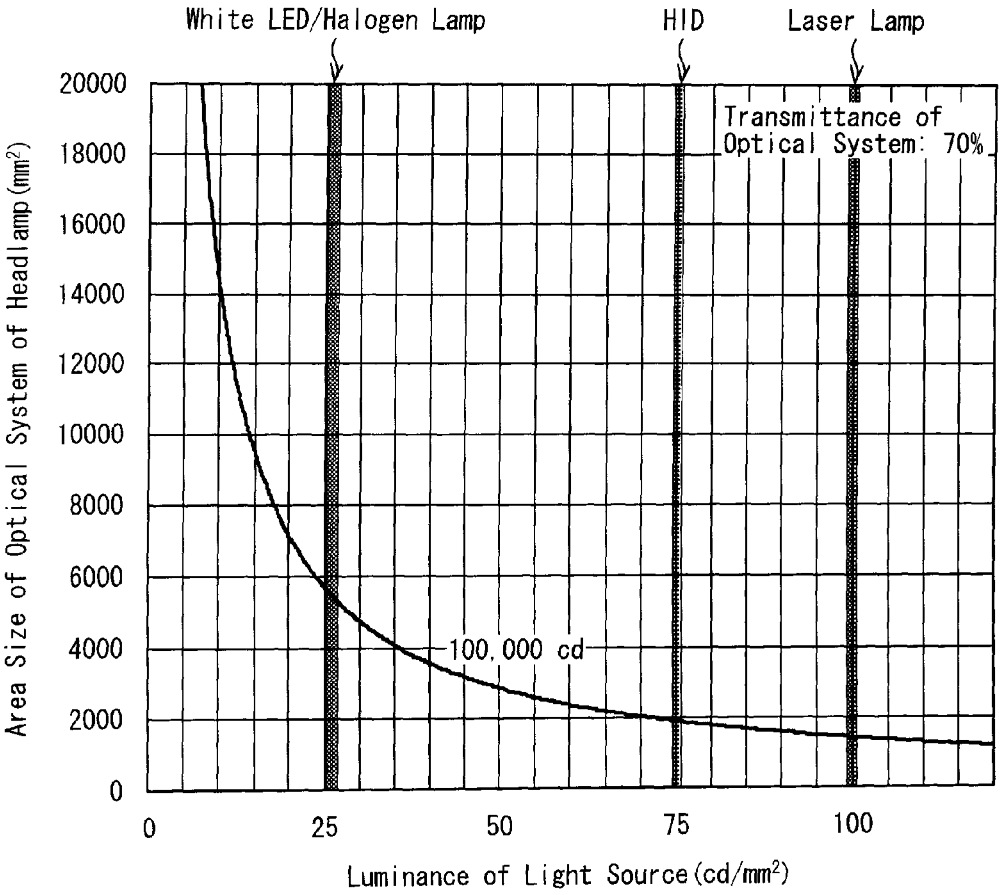
FIG. 4 is a graph illustrating how (i) a luminance of each of vehicle (automobile) headlamps including respective different light sources is related to (ii) an area size of an optical system of a corresponding one of the headlamps.

A comparative example, in which the present invention is compared with a conventional headlamp, is described below with reference to FIG. 4. FIG. 4 is a graph illustrating how (i) a luminance of each of vehicle (automobile) headlamps employing respective various light sources related to (ii) an area size of an optical system of a corresponding one of the headlamps. The graph shows values obtained in a case where a luminous intensity necessary for a headlamp (one lamp) is 100000 cd, and transmittance of the optical system is 70%. That is, FIG. 4 illustrates a result obtained by comparing the present invention with a commonly used headlamp 1 for a high beam.

As illustrated in FIG. 4, in a case of a halogen lamp (or LED) having a luminance of 25 cd/$mm^2$, the area size of the aperture plane needs to be approximately 5000 $mm^2$ so as to achieve light emission with a luminous intensity of 100000 cd. In a case of an HID lamp having a luminance of 75 cd/$mm^2$, the area size of the aperture plane needs to be 2000 $mm^2$.

However, as described earlier, it is difficult for the HID to make good use of its high luminance due to its configuration. Therefore, actually, it may be impossible to achieve an HID having a luminance of as high as 75 cd/$mm^2$. Further, the HID cannot be made smaller than a certain size. Therefore, taking into consideration the radiation efficiency of light (efficiency of the optical system), the area size of the aperture plane cannot be made smaller than 2000 $mm^2$ in some cases. In addition, the area size of the aperture plane needs to be 2222 $mm^2$ in a case where transmittance of the optical system is 60%.

That is, in the case of the HID, it is possible for the aperture plane to have an area size of 2000 $mm^2$ in theory; however, this is not always possible to achieve.

In contrast, according to the headlamp 1 in accordance with the present invention, the light emitting part 7 has a luminance of 80 cd/$mm^2$ or greater. Accordingly, even if transmittance of the optical system is 60%, the area size of the aperture plane 8*a* can be made smaller than 2000 $mm^2$ while achieving light emission with a luminous intensity of 100000 cd. That is, in a case of achieving light emission with a luminous intensity of 100000 cd with use of the optical system with transmittance of 70%, the headlamp 1 can have the aperture plane 8*a* whose area size is smaller than 2000 $mm^2$.

As described earlier, the leadlight 1 includes: the laser diode 3 that emits a laser beam; the light emitting part 7 that emits light upon receiving the laser beam emitted from the laser diode 3; and the reflection mirror 8 that reflects the light emitted from the light emitting part 7. The light emitting part 7 has a luminance of greater than 25 cd/$mm^2$. The reflection mirror 8 has the aperture plane (a surface perpendicular to a direction in which the light travels outward from the headlamp 1), whose area size is smaller than 2000 $mm^2$. In other words, a luminance of the light emitting part 7 is greater than 25 cd/$mm^2$, and an area size of an image of the reflection mirror 8, which image is projection of the light reflected by the reflection mirror 8, is less than 2000 $mm^2$.

For example, in a case where a conventional halogen lamp is used as a headlamp for a high beam, the following occurs: that is, if the halogen lamp emits light having a luminous intensity greater than or equal to the specified lower limit, the area size of the aperture plane may not be able to be smaller than 2000 $mm^2$. However, according to the headlamp 1, the light emitting part 7 has a luminance greater than 25 cd/$mm^2$, which is the maximum luminance that can be achieved by the halogen lamp. Accordingly, even if the area size of the aperture plane 8*a* is less than 2000 $mm^2$, it is possible to emit light having a luminous intensity falling within a range of luminous intensities specified for a high beam.

That is, in a case of using the halogen lamp as a headlamp and causing such a headlamp to emit light having a luminous intensity near 29500 cd, it may be impossible to reduce the area size of the aperture plane to less than 2000 $mm^2$. In contrast, according to the headlamp 1, the light emitting part has a luminance greater than 25 cd/$mm^2$, which is the maximum luminance that can be achieved by the halogen lamp. Accordingly, even if the area size of the aperture plane is reduced to less than 2000 $mm^2$, it is still possible to emit light having a luminous intensity falling within the range of for example 29500 cd to 112500 cd.

There is another high-intensity light source, which is the HID lamp having a luminance of 75 cd/$mm^2$. However, it has been found that the HID lamp involves a problem, in which it is inferior in immediate lighting, and therefore is not suitable for the headlamp for a high beam. That is, the HID lamp is not suitable for the vehicle headlamp that requires immediate lighting.

As such, the headlamp 1 can be designed to be markedly smaller in size than a conventional illuminating device, while taking practical utility into consideration. That is, it is possible to achieve a headlamp 1, which is smaller in size than the conventional illuminating device.

Even if the HID lamp is used as the headlamp for a high beam, the following problem occurs: that is, in a case where the area size of the aperture plane is less than 1500 $mm^2$, such a headlamp cannot emit light having a luminous intensity falling within the range of luminous intensities specified for a high beam (see Table 1). In contrast, according to the headlamp 1, the light emitting part 7 has a luminance greater than 75 cd/$mm^2$, which is the maximum luminance that can be achieved by the HID lamp for practical use. Accordingly, even if the area size of the aperture plane 8*a* is less than 1500 $mm^2$, it is still possible for the headlamp 1 to emit light having a luminous intensity falling within the range of luminous intensities specified for a high beam. That is, with the headlamp 1, it is possible to achieve the area size, of the aperture plane 8*a*, which cannot be achieved by the HID lamp which is not practically useful for a high beam.

Specifically, for example in a case of using, as a headlamp, the HID lamp having a luminance greater than that of the halogen lamp so as to cause such a headlamp to emit light having a luminous intensity falling within a range of for example 29500 cd to 112500 cd, the following occurs: that is, if the area size of the aperture plane is less than 1500 $mm^2$, it is not possible for the headlamp to emit light having a luminous intensity falling within the above range (see Table 1). In contrast, the headlamp 1 has a luminance greater than 75 cd/$mm^2$, which is the maximum luminance that can be achieved by the HID lamp for practical use. Accordingly, even if the area size of the aperture plane is less than 1500 $mm^2$, it is still possible for the headlamp 1 to emit light having a luminous intensity falling within the above range. As such, it is possible to achieve a smaller headlamp 1.

Further, by mounting, as a high beam, the headlamp 1 to an automobile, it is possible to achieve a high beam markedly smaller in size than a conventional high beam. Accordingly, it is possible to improve flexibility in design of an automobile.

(Structure of Laser Diode 3)

The following description discusses a fundamental structure of the laser diode 3. (*a*) of FIG. 5 is a view schematically illustrating a circuit diagram of the laser diode 3. (*b*) of FIG. 5 is a perspective view illustrating a fundamental structure of the laser diode 3. As illustrated in FIG. 5, the laser diode 3 includes: a cathode electrode 19, a substrate 18, a clad layer 113, an active layer 111, a clad layer 112, and an anode electrode 17, which are stacked in this order.

The substrate 18 is a semiconductor substrate. In order to obtain excitation light such as from blue excitation light to ultraviolet excitation light so as to excite a fluorescent material as in the present invention, it is preferable that the substrate 18 be made of GaN, sapphire, and/or SiC. Generally, for example, a substrate for the laser diode is constituted by: a IV group semiconductor such as that made of Si, Ge, or SiC; a III-V group compound semiconductor such as that made of GaAs, GaP, InP, AlAs, GaN, InN, InSb, GaSb, or AlN; a II-VI group compound semiconductor such as that made of ZnTe, ZeSe, ZnS, or ZnO; oxide insulator such as ZnO, $Al_2O_3$, $SiO_2$, $TiO_2$, $CrO_2$, or $CeO_2$; or nitride insulator such as SiN.

The anode electrode 17 injects an electric current into the active layer 111 via the clad layer 112.

The cathode electrode 19 injects, from a bottom of the substrate 18 and via the clad layer 113, an electric current into the active layer 111. The electrical current is injected by applying forward bias to the anode electrode 17 and the cathode electrode 19.

The active layer 111 is sandwiched between the clad layer 113 and the clad layer 112.

Each of the active layer 111 and the clad layers 112 and 113 is constituted by, so as to obtain excitation light such as from blue excitation light to ultraviolet excitation light, a mixed crystal semiconductor made of AlInGaN. Generally, each of an active layer and clad layer of the laser diode is constituted by a mixed crystal semiconductor, which contains as a main composition Al, Ga, In, As, P, N, and/or Sb. The active layer and clad layers in accordance with the present invention can also be constituted by such a mixed crystal semiconductor. Alternatively, the active layer and clad layers can be constituted by a II-VI group compound semiconductor such as that made of Zn, Mg, S, Se, Te, or ZnO.

The active layer 111 emits light upon injection of the electric current. The light emitted from the active layer 111 is kept within the active layer 111, due to a difference in refractive indices of the clad layer 112 and the clad layer 113.

The active layer 111 further has a front cleavage surface 114 and a back cleavage surface 115, which face each other so as to keep, within the active layer 111, light that is enhanced by induced emission. The front cleavage surface 114 and the back cleavage surface 115 serve as mirrors.

Note however that, unlike a mirror that reflects light completely, the front cleavage surface 114 and the back cleavage surface 115 (for convenience of description, these are collectively referred to as the front cleavage surface 114 in the present embodiment) of the active layer 111 transmits part of the light enhanced due to induced emission. The light emitted outward from the front cleavage surface 114 is excitation light L0. The active layer 111 can have a multilayer quantum well structure.

The back cleavage surface 115, which faces the front cleavage surface 114, has a reflection film (not illustrated) for laser oscillation. By differentiating reflectance of the front cleavage surface 114 from reflectance of the back cleavage surface 115, it is possible for most of the excitation light L0 to be emitted from a luminous point 103 of an end surface having low reflectance (e.g., the front cleavage surface 114).

Each of the clad layer 113 and the clad layer 112 can be constituted by: a n-type or p-type III-V group compound semiconductor such as that made of GaAs, GaP, InP, AlAs, GaN, InN, InSb, GaSb, or AlN; or a n-type or p-type II-VI group compound semiconductor such as that made of ZnTe, ZeSe, ZnS, or ZnO. The electrical current can be injected into the active layer 111 by applying forward bias to the anode electrode 17 and the cathode electrode 19.

A semiconductor layer such as the clad layer 113, the clad layer 112, and the active layer 111 can be formed by a commonly known film formation method such as MOCVD (metalorganic chemical vapor deposition), MBE (molecular beam epitaxy), CVD (chemical vapor deposition), laser-ablation, or sputtering. Each metal layer can be formed by a commonly known film formation method such as vacuum vapor deposition, plating, laser-ablation, or sputtering.

(Principle of Light Emission of Light Emitting Part 7)

Next, the following description discusses a principle of a fluorescent material emitting light upon irradiation of a laser beam oscillated from the laser diode 3.

First, the fluorescent material contained in the light emitting part 7 is irradiated with the laser beam oscillated from the laser diode 3. Upon irradiation of the laser beam, an energy state of electrons in the fluorescent material is excited from a low energy state into a high energy state (excitation state).

After that, since the excitation state is unstable, the energy state of the electrons in the fluorescent material returns to the low energy state (an energy state of a ground level, or an energy state of an intermediate metastable level between ground and excited levels) after a certain period of time.

As described above, the electrons excited to be in the high energy state returns to the low energy state. In this way, the fluorescent material emits light.

Note here that, white light can be made by mixing three colors which meet the isochromatic principle, or by mixing two colors which are complimentary colors for each other. The white light can be obtained by combining (i) a color of the laser beam oscillated from the laser diode 3 and (ii) a color of the light emitted from the fluorescent material on the basis of the foregoing principle and relation.

Embodiment 2

Another embodiment of the present invention is described below with reference to FIGS. 6 through 8. Note that, members same as those described in Embodiment 1 are assigned like referential numerals, and their descriptions are omitted here.

(Configuration of Headlamp 1*a*)

First, the following description discusses, with reference to FIG. 6, a configuration of a headlamp (vehicle headlamp) 1*a* of the present embodiment. FIG. 6, showing another configuration of the headlamp 1 in accordance with Embodiment 1, is a cross-sectional view illustrating how a headlamp 1*a*, which is a projector-type headlamp, is configured. The headlamp 1*a* is another example of a configuration for achieving a headlamp markedly smaller in size than a conventional headlamp. The headlamp 1*a* is different from the headlamp 1 in that the headlamp 1*a* is a projector-type headlamp, and includes an optical fiber 5 in place of the truncated pyramid-shaped optical element 21, truncated cone-shaped optical element 22, or of the light guides 23.

As illustrated in FIG. 6, the headlamp 1*a* includes a laser diode array (excitation light source) 2, aspheric lenses 4, an optical fiber (light guide section) 5, a ferrule 6, a light emitting part 7, a reflection mirror 8, a transparent plate 9, a housing 10, an extension 11, a lens 12, a convex lens 14, and a lens holder 16. The laser diode array 2, the optical fiber 5, the ferrule 6, and the light emitting part 7 constitute a fundamental structure of a light emitting device. The headlamp 1*a* is a projector-type headlamp, and therefore includes the convex lens 14. The present invention can be applied also to another kind of headlamp, such as a semi-shield beam headlamp. In this case, the convex lens 14 can be omitted. Note that descriptions for functions of the aspheric lenses 4, the light emitting part 7, the reflection mirror 8, and the transparent plate 9, which functions are same as those of a case where they are provided in the headlamp 1, are omitted here.

The laser diode array 2 serves as an excitation light source that emits excitation light, and has a plurality of laser diodes (laser diode elements) 3 provided on a substrate. Since the laser diodes 3 are configured in the same manner as those included in the headlamp 1, descriptions for the laser diodes 3 are omitted here.

The aspheric lenses 4 are lenses for guiding laser beams (excitation light) oscillated from the laser diodes 3 so that they enter ends (entrance end parts 5*b*) of the optical fiber 5.

The optical fiber 5 is a light guide for guiding, to the light emitting part 7, laser beams oscillated from the laser diodes 3. The optical fiber 5 is constituted by a bundle of a plurality of optical fibers. The optical fiber 5 has a plurality of entrance end parts 5*b* and a plurality of exit end parts 5*a*. The optical fiber 5 receives the laser beams through the plurality of entrance end parts 5*b*, and emits, through the exit end parts 5*a*, the laser beams received through the plurality of entrance end parts 5*b*. The plurality of exit end parts 5*a* emit laser beams toward respective different regions on a laser beam-irradiated surface (light receiving surface) 7*a* of the light emitting part 7 (refer to FIG. 7). In other words, through the plurality of exit end parts 5*a*, the laser beams are emitted to the respective different regions on the light emitting part 7. The plurality of exit end parts 5*a* can be in contact with the laser beam-irradiated surface 7*a*, and can be at a short distance from the laser beam-irradiated surface 7*a*.

The optical fiber 5 has a double-layered structure, which consists of (i) a center core and (ii) a clad which surrounds the core and has a refractive index lower than that of the core. The core is made mainly of fused quartz (silicon oxide), which absorbs little laser beam and thus prevents a loss of the laser beam. The clad is made mainly of one of fused quartz and synthetic resin material, which have a refractive index lower than that of the core. For example, the optical fiber 5 is made of quartz, and has a core of 200 μm in diameter, a clad of 240 μm in diameter, and numerical apertures (NA) of 0.22. Note however that a structure, diameter, and material of the optical fiber 5 are not limited to those described above. The optical fiber 5 can have a rectangular cross-sectioned surface, which is perpendicular to a longitudinal direction of the optical fiber 5.

The light guide can be a member other than the optical fiber, or can be a combination of the optical fiber and another member. The light guide can be any member as long as the light guide has at least one entrance end part, through which the light guide receives laser beams oscillated from the laser diodes 3, and a plurality of exit end parts, through which the light guide emits the laser beams received through the at least one entrance end part. For example, the light guide can be configured such that (i) an entrance part including at least one entrance end part and (ii) an exit part including a plurality of exit end parts are made separately from the optical fiber, and the entrance part and the exit part are connected to respective ends of the optical fiber.

FIG. 7 is a view illustrating positional relation between the exit end parts 5*a* and the light emitting part 7. As illustrated in FIG. 7, the ferrule 6 holds, in a predetermined pattern, the plurality of exit end pats 5*a* of the optical fiber 5 with respect to the laser beam-irradiated surface 7*a* of the light emitting part 7. The ferrule 6 can have holes provided thereon in a predetermined pattern so as to accommodate the exit end parts 5*a*. Alternatively, the ferrule 6 can be separated into an upper part and a lower part, each of which has on its bonding surface grooves for sandwiching and accommodating the exit end parts 5*a*.

The ferrule 6 can be fixed to the reflection mirror 8 by a bar-shaped or tubular member etc. that extends from the reflection mirror 8. The ferrule 6 is not particularly limited in material, and is made of for example stainless steel. Note here that, although three exit end parts 5*a* are provided in FIG. 7 so as to correspond to the number of the laser diodes 3 (i.e., the number of optical fibers), the number of the exit end parts 5*a* is not limited to three.

The light emitting part 7 includes a fluorescent material that emits light upon receiving a laser beam, and emits light upon receiving the laser beams emitted from the exit end parts 5*a*. The light emitting part 7 is provided in the vicinity of a first focal point (described later) of the reflection mirror 8, and is fixed to an inside surface (which faces the exit end parts 5*a*) of the transparent plate 9 so as to face the exit end parts 5*a* (see FIG. 6).

FIG. 8 is a cross sectional view illustrating a modification of a method of positioning the light emitting part 7. As illustrated in FIG. 8, the light emitting part 7 can be fixed to an end of a tubular part 15 that extends through a central portion of the reflection mirror 8. In this case, the exit end parts 5*a* of the optical fiber 5 can be provided inside the tubular part 15. Further, according to this configuration, the transparent plate 9 can be omitted.

The reflection mirror 8 is for example a member whose surface is coated with metal thin film. The reflection mirror 8 reflects light emitted from the light emitting part 7, in such a way that the light is converged on a focal point of the reflection mirror 8. Since the headlamp 1*a* is a projector-type headlamp, a cross-sectional surface, of the reflection mirror 8, which is in parallel with a light axis of the light reflected by the reflection mirror 8 is basically in an elliptical shape. The reflection mirror 8 has the first focal point and a second focal point. The second focal point is closer to an opening of the reflection mirror 8 than the first focal point is. The convex lens 14 (described later) is provided so that its focal point is in the vicinity of the second focal point, and projects light in a front direction, which light is converged by the reflection mirror 8 on the second focal point.

Further, according to the present embodiment, the opening of the reflection mirror 8 is a plane (i.e., a plane, of the reflection mirror 8, which is perpendicular to a direction in which the light travels outward from the headlamp 1*a* [vehicle headlamp]) perpendicular to a direction (i.e., direction of the light axis of the convex lens 14) in which the light emitted from the convex lens 14 travels, and includes an aperture plane 8*b* which includes a shorter axis of the elliptical reflection mirror 8.

The transparent plate 9 is a transparent resin plate which covers the opening of the reflection mirror 8, and holds the light emitting part 7 thereon. That is, the light emitting part 7 is held by the transparent plate 9 so as to be in the vicinity of the first focal point of the reflection mirror 8.

The housing 10 is part of a body of the headlamp 1*a*, and holds the reflection mirror 8 etc. therein. The optical fiber 5 penetrates the housing 10. The laser diode array 2 is provided outside the housing 10. Note here that the laser diode array 2 generates heat when oscillating a laser beam. In this regard, since the laser diode array 2 is provided outside the housing 10, the laser diode array 2 can be efficiently cooled down. Further, since the laser diodes 3 are prone to failure, it is preferable that the laser diodes 3 be provided so that they can be easily replaced. If there is no need to take these points into consideration, the laser diode array 2 can be provided inside the housing 10.

The extension 11 is provided in an anterior portion of a side surface of the reflection mirror 8. The extension 11 hides an inner structure of the headlamp 1*a* so that the headlamp 1*a* looks better, and also strengthens connection between the reflection mirror 8 and an automobile body. The extension 11 is, like the reflection mirror 8, a member whose surface is coated with a metal thin film.

The lens 12 is provided on the opening of the housing 10, and seals the headlamp 1*a*. The light emitted from the light emitting part 7 travels in a front direction from the headlamp 1*a* through the lens 12.

The convex lens 14 converges the light emitted from the light emitting part 7, and projects the converged light in the front direction from the headlamp 1*a*. The convex lens 14 has its focal point in the vicinity of the second focal point of the reflection mirror 8, and its light axis in a substantially central portion of a light emitting surface of the light emitting part 7 (i.e., a surface, of the light emitting part 7, which faces the convex lens 14 and is attached to the transparent plate 9). The convex lens 14 is held by the lens holder 16, and is specified for its relative position with respect to the reflection mirror 8.

The convex lens 14 is held by the lens holder 16 generally in such a way that a cross-sectional surface, of the convex lens 14, which is perpendicular to the light axis of the convex lens 14 and faces the reflection mirror 8 is smaller in area size than the aperture plane 8*b*. Note however that the area size of the cross-sectional surface of the convex lens 14 is not limited to this. That is, the convex lens 14 and the lens holder 16 can be provided in such a way that a wall of the lens holder 16 is in parallel with the light axis, and that the cross-sectional surface of the convex lens 14 has the same area size as that of the aperture plane 8*b*.

That is, in a case where the cross-sectional surface of the convex lens 14 is smaller in area size than the aperture plane 8*b*, the "area size of the aperture plane, of the reflection mirror 8, which is perpendicular to a direction in which the light travels outwards from the headlamp 1" in the present embodiment means an area size of the cross-sectional surface of the convex lens. Specifically, in this case, it is assumed that the reflection mirror 8 and the lens holder 16 constitute one body, and an aperture plane 8*c* (equivalent to the cross-sectional surface of the convex lens 14) of the lens holder 16, on which the convex lens 14 is provided, is referred to as the "aperture plane of the reflection mirror 8". On the other hand, in a case where the aperture plane 8*b* and the aperture plane 8*c* have an identical area size, the "area size of the aperture plane" can mean the area size of the aperture plane 8*b*. That is, the "area size of the aperture plane" is an area size of a cross-sectional surface of a region through which the light reflected by the reflection mirror 8 is emitted.

As is the case with the aperture plane 8*a*, the "area size of the aperture plane" in accordance with the present embodiment is not less than 300 $mm^2$ but less than 2000 $mm^2$, and preferably not less than 500 $mm^2$ but less than 1500 $mm^2$. The lower limit of the area size can be 100 $mm^2$. In other words, an area size of an image of the reflection mirror 8, which image is projection of the light reflected by the reflection mirror 8, can be not less than 300 $mm^2$ but less than 2000 $mm^2$, and preferably not less than 500 $mm^2$ but less than 1500 $mm^2$. The lower limit of the area size of the image can be 100 $mm^2$. Note here that, each of the aperture plane 8*b* and the aperture plane 8*c* of the present embodiment is described, in a similar way to the aperture plane 8*a*, on the assumption that each of the aperture plane 8*b* and the aperture plane 8*c* is in a circular shape; however, the shape of each of the aperture plane 8*b* and the aperture plane 8*c* is not limited to the circular shape as long as each of the aperture plane 8*b* and the aperture plane 8*c* has an area size falling within the above range.

As so far described, according also to the present embodiment, the laser diodes 3 emit high-power laser beams to the light emitting part 7, and the light emitting part 7 can receive the laser beams. Accordingly, it is possible to achieve a headlamp 1*a* with high luminance and high luminous flux, in which the light emitting part 7 emits light flux of approximately 2000 lm and has a luminance of 100 cd/$mm^2$, like the headlamp 1.

As is the case with Embodiment 1, according to the projector-type headlamp 1*a*, the light emitting part 7 has a luminance of not less than 80 cd/$mm^2$, and the area size of the aperture plane 8*b* or of the aperture plane 8*c* is less than 2000 $mm^2$. This makes it possible to achieve a headlamp markedly smaller in size than a conventional illuminating device, while taking practical utility into consideration. The headlamp 1*a*, like the headlamp 1, is particularly suitable for use as a high beam.

Further, in a case where the area size of the aperture plane 8*b* or of the aperture plane 8*c* is less than 1500 $mm^2$, it is possible to achieve the aperture plane 8*b* or the aperture plane 8*c* that cannot be achieved by the HID lamp, which is not so suitable for practical use as a high beam. That is, the headlamp 1*a* has a luminance greater than 75 cd/$mm^2$, which is the maximum luminance that can be achieved by the HID lamp for practical use. Therefore, even if the area size of the aperture plane is less than 1500 $mm^2$, it is still possible for the headlamp 1*a* to emit light having a luminous intensity falling within a range of for example 29500 cd to 112500 cd. As such, it is possible to achieve a smaller headlamp 1*a*.

[Modifications of Headlamp 1 and Headlamp 1*a*]

The foregoing descriptions discussed the headlamp 1 of Embodiment 1 and the headlamp 1*a* of Embodiment 2 on the assumption that the headlamp 1 and the headlamp 1*a* meet the light distribution property standards for a high beam. Note however that the headlamp 1 and the headlamp 1*a* can be used also as a passing headlamp (i.e., a low beam) for an automobile.

In this case, each of the headlamp 1 and the headlamp 1*a* should to be configured so as to meet the light distribution property standards for a passing headlamp for an automobile. Each of the headlamp 1 and the headlamp 1*a* can include for example a light emitting part, which has a light emitting surface having a shape that corresponds to that of a light irradiated region as specified by the standards. In a case of a projector-type headlamp such as the headlamp 1*a*, a light shielding plate, which is configured so as to meet the light distribution property standards for the passing headlamp, can be provided between the light emitting part and the convex lens which projects, in a front direction, the light emitted from the light emitting part (i.e., the light reflected by the reflection mirror). In a case where the headlamp 1*a* includes both (i) the light emitting part having the light emitting surface having the above shape and (ii) the light shielding plate, it is possible to prevent blur of a projection image in an area at a distance from a light axis of the convex lens.

Next, the following description discusses, with reference to FIG. 9, the light distribution property required for the passing headlamp for an automobile.

(*a*) of FIG. 9 is a view illustrating the light distribution property required for the passing headlamp for an automobile (extracted from Public Notice Specifying Details of Safety Standards for Road Vehicle [Oct. 15, 2008] Appendix 51 (Specified Standards for Style of Headlamp). (*a*) of FIG. 9 illustrates an image of light projected to a screen, which is provided vertically and 25 m ahead of an automobile. Note here that the light is emitted from the passing headlamp.

In (*a*) of FIG. 9, a region below a horizontal straight line, which is 750 mm below a straight line hh serving as a horizontal reference straight line, is referred to as Zone I. At any point in Zone I, an illuminance should be two times or more lower than an actual illuminance measured at the point 0.86D-1.72L.

A region above an unfilled region (which is referred to as a bright region) is referred to as Zone III. At any point in Zone III, an illuminance should be 0.85 lx (lux) or lower. That is, Zone III is a region in which the illuminance of a beam should be lower than a certain level (such a region is referred to as a dark region) for the purpose of preventing the beam from interrupting other traffic. A borderline between Zone III and the bright region includes a straight line 31, which is at an angle of 15 degrees with the straight line hh, and a straight line 32, which is at an angle of 45 degrees with the straight line hh.

A region defined by four straight lines, i.e., a region defined by (i) a horizontal straight line 375 mm below the straight line hh, (ii) the horizontal straight line 750 mm below the straight line hh, (iii) a vertical straight line provided on a left side at a distance of 2250 mm from a straight line VV serving as a vertical reference straight line and (iv) a vertical straight line provided on a right side at a distance of 2250 mm from the straight line VV, is referred to as Zone IV. At any point in Zone IV, an illuminance should be higher than or equal to 3 lx. That is, Zone IV is the brightest region in the bright region, which is between Zone I and Zone III.

(*b*) of FIG. 9 is a table showing an illuminance specified by the light distribution property standards for the passing headlamp. As shown in (*b*) of FIG. 9, at the point 0.6D-1.3L and the point 0.86D-1.72L, an illuminance should be higher than other surrounding regions. These points are in direct front of the automobile. Therefore, at these points, the illuminance should be high enough for a driver etc. to recognize obstacles etc. present ahead, even at night.

[Another Description of Present Invention]

The present invention can also be expressed as follows.

That is, the vehicle headlamp in accordance with the present invention is preferably configured such that: the light emitting part has a luminance greater than 75 cd/$mm^2$; and the aperture plane has an area size of less than 1500 $mm^2$.

For example, in a case where an HID lamp, which has a luminance greater than that of a halogen lamp, is used as an vehicle headlamp so as to emit light having for example a luminous intensity falling within the foregoing range of luminous intensities, the following occurs: that is, if the area size of the aperture plane is less than 1500 $mm^2$, such a vehicle headlamp cannot emit light having the luminous intensity falling within the above range (refer to Table 1).

In this regard, according to the vehicle headlamp in accordance with the present invention configured as above, the light emitting part has a luminance greater than 75 cd/$mm^2$, which is the maximum luminance that can be achieved by the HID lamp for practical use. Therefore, even if the area size of the aperture plane is less than 1500 $mm^2$, the vehicle headlamp can emit light having a luminous intensity falling within the above range. Accordingly, the present invention makes it possible to achieve a smaller vehicle headlamp. Note that, with this configuration, it is possible to achieve the above area size of the aperture plane which area size cannot be achieved by the HID lamp, which is not so suitable for practical use as the vehicle headlamp (e.g., a driving headlamp) that requires immediate lighting.

The vehicle headlamp in accordance with the present invention is preferably configured such that: the aperture plane has an area size of greater than or equal to 100 $mm^2$.

Note here that an area size of a surface, of the light emitting part, which is irradiated with the excitation light, is limited (for example, the area size needs to be greater than or equal to 1 $mm^2$). In view of this, if the area size of the aperture plane is for example less than 100 $mm^2$, then the light emitting part becomes large with respect to the reflection mirror. This may cause a reduction in a radiation efficiency of light.

In this regard, according to the configuration, the area size of the aperture plane is greater than or equal to 100 $mm^2$. This makes it possible to achieve a light emitting part sufficiently small with respect to the reflection mirror, thereby preventing a reduction in a radiation efficiency of light. That is, it is possible to achieve a vehicle headlamp with a high radiation efficiency of light.

The vehicle headlamp in accordance with the present invention is preferably configured such that: the excitation light emitted from the excitation light source has a peak wavelength falling within a range of not less than 400 nm but not more than 420 nm.

According to the configuration, the excitation light source emits an excitation light at a wavelength of not less than 400 nm but not more than 420 nm, i.e., an excitation light of bluish purple or of a similar color. This makes it possible to easily select and prepare a material (a raw material of a fluorescent material) of the light emitting part for producing white light. That is, it is possible to achieve a vehicle headlamp that can easily produce white light.

The vehicle headlamp in accordance with the present invention is preferably configured such that: the excitation light emitted from the excitation light source has a peak wavelength falling within a range of not less than 440 nm but not more than 490 nm.

According to the configuration, the excitation light source emits an excitation light at a wavelength of not less than 440 nm but not more than 490 nm, i.e., an excitation light of blue or of a similar color. This makes it possible to easily select and prepare a material (a raw material of a fluorescent material) of the light emitting part for producing white light. That is, it is possible to achieve a vehicle headlamp that can easily produce white light.

It is preferable that the vehicle headlamp in accordance with the present invention serve as a driving headlamp for an automobile.

For example, in a case where a conventional halogen lamp is used as a driving headlamp, the following occurs: that is, in a case where an area size of an aperture plane is less than 2000 $mm^2$, it may be impossible for such a driving headlamp to emit light having a luminous intensity greater than or equal to a lower limit of the foregoing range of luminous intensities. Further, a conventional HID lamp is not suitable for use as the driving headlamp that requires immediate lighting, because the conventional HID lamp is inferior in immediate lighting.

As such, the vehicle headlamp in accordance with the present invention makes it possible to achieve a driving headlamp smaller in size than a conventional lamp, while taking practical utility into consideration.

An illuminating device (i.e., a laser headlamp) in accordance with the present invention employs a combination of: a laser illumination source including (i) an excitation light source including a laser diode capable of high-power oscillation and (ii) a light emitting part that emits light responsive to the excitation light from the excitation light source; and an optical system having a frontal projected area of less than or equal to 2000 $mm^2$. Accordingly, it is possible to achieve a very small headlamp (for a high beam), which is 50 mm or less in diameter (=an area size is 2000 $mm^2$ or less), while achieving brightness of higher or equal to that of a conventional vehicle headlamp.

[Note]

The invention is not limited to the description of the embodiments above, but may be altered within the scope of the claims. An embodiment based on a proper combination of technical means altered within the scope of the claims is encompassed in the technical scope of the invention.

For example, a high-power LED can be used as the excitation light source. In this case, a light emitting device that emits white light can be achieved by combining (i) an LED that emits light at a wavelength of 450 nm (blue) and (ii) (a) a yellow fluorescent material or (b) green and red fluorescent materials. In this case, the LED needs to have output greater or equal to that of the laser diode included in the illuminating device in accordance with the present invention.

Alternatively, a solid laser other than the laser diode, e.g., a light emitting diode with high power output, can be used as the excitation light source. Note however that the laser diode is preferable, because the laser diode makes it possible to downsize the excitation light source.

Further, the laser diode 3 and the light emitting part 7 can be a single body (i.e., the light guide is not necessary) so that the laser beam emitted from the laser diode 3 is appropriately received by the laser beam-irradiated surface 7*a* of the light emitting part 7.

The aperture plane 8*a* and the aperture plane 8*b* (aperture plane 8*c*) of the reflection mirror 8 are each in a circular shape when viewed from a direct front of the automobile. Note however that the shape is not limited to the circular shape, and can be an ellipse shape or a rectangular shape etc. as long as the light reflected by the reflection mirror 8 is efficiently emitted outward.

INDUSTRIAL APPLICABILITY

The present invention is an illuminating device markedly smaller in size than a conventional illuminating device, and is applicable particularly to a vehicle headlamp.

Reference Signs List

| | |
|---|---|
| 1, 1a | Headlamp (Vehicle Headlamp, Driving Headlamp) |
| 3 | Laser Diode (Excitation Light Source) |
| 7 | Light Emitting Part |
| 8 | Reflection Mirror |
| 8a, 8b, 8c | Aperture Plane |

The invention claimed is:

1. A vehicle headlamp, comprising:

an excitation light source that emits excitation light;

a light emitting part that emits light upon receiving the excitation light emitted from the excitation light source; and an optical system that distributes the light emitted from the light emitting part, the light emitting part having a luminance greater than 75 cd/mm$^2$, and an area size of the optical system, when viewed from a direction in which the light travels outward from the vehicle headlamp, being less than 1500 mm$^2$, and at least 100 times as large as an area size of a surface of the light-emitting part, which surface receives the excitation light.

2. The vehicle headlamp according to claim 1, wherein the area size of the optically system is greater than or equal to 100 mm$^2$.

3. The vehicle headlamp according to claim 1, wherein the excitation light emitted from the excitation light source has a peak wavelength falling within a range of not less than 400 nm but not more than 420 nm.

4. The vehicle headlamp according to claim 1, wherein the excitation light emitted from the excitation light source has a peak wavelength falling within a range of not less than 440 nm but not more than 490 nm.

5. The vehicle headlamp according to claim 1, which vehicle headlamp serves as a driving headlamp for an automobile.

6. A vehicle headlamp according to claim 1, wherein the excitation light source is provided outside the optical system, and the light-emitting part is provided inside the optical system.

7. An illuminating device, comprising:

an excitation light source that emits excitation light;

a light emitting part that emits light upon receiving the excitation light emitted from the excitation light source; and an optical system that distributes the light emitted from the light emitting part, the light emitting part having a luminance greater than 75 cd/mm$^2$, and an area size of the optical system, when viewed from a direction in which the light travels outward from the illumination device being less than 1500 mm$^2$, and at least 100 times as large as an area size of a surface of the light-emitting part, which surface receives the excitation light.

* * * * *